United States Patent
Kaiser et al.

(10) Patent No.: US 12,472,118 B2
(45) Date of Patent: Nov. 18, 2025

(54) MULTIPLE-JOINT THERAPY MACHINE

(71) Applicant: Physiohab LLC, Sunrise, FL (US)

(72) Inventors: Robert T. Kaiser, West Grove, PA (US); Eduardo M. Marti, Sunrise, FL (US)

(73) Assignee: PHYSIOHAB LLC, Sunrise, FL (US)

( * ) Notice: Subject to any disclaimer, the term of this patent is extended or adjusted under 35 U.S.C. 154(b) by 188 days.

(21) Appl. No.: 18/388,170

(22) Filed: Nov. 8, 2023

(65) Prior Publication Data

US 2024/0148590 A1    May 9, 2024

Related U.S. Application Data

(60) Provisional application No. 63/423,734, filed on Nov. 8, 2022.

(51) Int. Cl.
*A61H 1/02* (2006.01)

(52) U.S. Cl.
CPC ........ *A61H 1/02* (2013.01); *A61H 2201/0119* (2013.01); *A61H 2201/0192* (2013.01); *A61H 2201/1472* (2013.01); *A61H 2201/1676* (2013.01); *A61H 2201/5023* (2013.01)

(58) Field of Classification Search
CPC .... A61H 1/0281; A61H 1/0288; A61H 1/024; A61H 1/0277
See application file for complete search history.

(56) References Cited

U.S. PATENT DOCUMENTS

| | | |
|---|---|---|
| 4,310,154 A | 1/1982 | Kauffman |
| 4,671,257 A | 6/1987 | Kaiser et al. |
| 4,691,694 A | 9/1987 | Boyd et al. |
| 4,825,852 A | 5/1989 | Genovese et al. |
| 4,834,073 A | 5/1989 | Bledsoe et al. |
| 4,863,499 A | 9/1989 | Osendorf |

(Continued)

FOREIGN PATENT DOCUMENTS

WO    2022047398 A1    3/2022

OTHER PUBLICATIONS

Kinetec® Centura™ Shoulder CPM, Global Industrial, downloaded from web page: <https://globalindustrial.com/p/medical-lab/physical-therapy/modalities/shoulder-cpm>, Download date: Aug. 20, 2020, original posting date: unknown, 1 page.

(Continued)

*Primary Examiner* — LaToya M Louis
(74) *Attorney, Agent, or Firm* — Panitch Schwarze Belisario & Nadel LLP

(57) ABSTRACT

A multiple-joint therapy machine includes a support frame and a rotatable base supported at a selectable height on the support frame. The rotatable base is configured to be releasably securable at a selectable angular orientation with respect to the support frame. A carrier link is at least pivotably mounted with respect to the rotatable base and is movable at least pivotably with respect to the rotatable base about a main axis. A geared hinge at least pivotably connects the carrier link with respect to the rotatable base. The geared hinge includes a main shaft and an attached sun gear. A planet carrier is rotatably attached to the main shaft. A planet shaft and an attached planet gear are rotatably attached to the planet carrier.

7 Claims, 28 Drawing Sheets

(56) References Cited

U.S. PATENT DOCUMENTS

| | | | |
|---|---|---|---|
| 4,869,499 A | 9/1989 | Schiraldo | |
| 4,873,967 A | 10/1989 | Sutherland | |
| 4,905,676 A | 3/1990 | Bond et al. | |
| 5,052,375 A | 10/1991 | Stark et al. | |
| 5,167,612 A | 12/1992 | Bonutti | |
| 5,179,939 A | 1/1993 | Donovan et al. | |
| 5,209,223 A | 5/1993 | McGorry et al. | |
| 5,213,094 A | 5/1993 | Bonutti | |
| 5,239,987 A | 8/1993 | Kaiser et al. | |
| 5,403,251 A | 4/1995 | Belsito et al. | |
| 5,683,351 A * | 11/1997 | Kaiser | A61H 1/0288 601/40 |
| 5,848,979 A | 12/1998 | Bonutti et al. | |
| 5,951,499 A | 9/1999 | Saringer et al. | |
| 6,007,500 A | 12/1999 | Quintinskie, Jr. | |
| 6,113,562 A | 9/2000 | Bonutti et al. | |
| 6,155,994 A | 12/2000 | Hubbard et al. | |
| 6,267,735 B1 | 7/2001 | Blanchard et al. | |
| 6,669,660 B2 | 12/2003 | Branch | |
| 6,695,795 B2 | 2/2004 | Knoll | |
| 6,702,768 B2 | 3/2004 | Mano et al. | |
| 6,872,186 B2 | 3/2005 | Branch et al. | |
| 6,872,187 B1 | 3/2005 | Stark et al. | |
| 6,984,197 B2 | 1/2006 | Sugiyama et al. | |
| 7,108,664 B2 | 9/2006 | Mason et al. | |
| 7,112,179 B2 | 9/2006 | Bonutti et al. | |
| 7,204,814 B2 | 4/2007 | Peles | |
| 7,452,342 B2 | 11/2008 | Bonutti et al. | |
| 7,479,121 B2 | 1/2009 | Branch | |
| 7,547,289 B2 | 6/2009 | Branch | |
| 7,665,167 B2 | 2/2010 | Branch et al. | |
| 7,686,775 B2 | 3/2010 | Branch | |
| 7,695,416 B2 | 4/2010 | Weiner | |
| 7,874,996 B2 | 1/2011 | Weinstein et al. | |
| 7,955,286 B2 | 6/2011 | Bonutti et al. | |
| 7,981,067 B2 | 7/2011 | Bonutti et al. | |
| 7,985,227 B2 | 7/2011 | Branch et al. | |
| 8,012,108 B2 | 9/2011 | Bonutti et al. | |
| 8,066,656 B2 | 11/2011 | Bonutti et al. | |
| 8,206,329 B2 | 6/2012 | Bonutti et al. | |
| 8,273,043 B2 | 9/2012 | Bonutti et al. | |
| 8,287,479 B2 | 10/2012 | Bonutti et al. | |
| 8,361,002 B2 | 1/2013 | Branch | |
| 8,591,441 B2 | 11/2013 | Bonutti et al. | |
| 8,591,443 B2 | 11/2013 | Bonutti et al. | |
| 8,784,343 B2 | 7/2014 | Bonutti et al. | |
| 8,814,816 B2 | 8/2014 | Bonutti et al. | |
| 8,840,570 B2 | 9/2014 | Branch et al. | |
| 8,905,950 B2 | 12/2014 | Bonutti et al. | |
| 8,920,346 B2 | 12/2014 | Bonutti et al. | |
| 9,248,041 B2 | 2/2016 | Bonutti et al. | |
| 9,289,157 B2 | 3/2016 | Branch et al. | |
| 9,314,392 B2 | 4/2016 | Bonutti et al. | |
| 9,320,669 B2 | 4/2016 | Bonutti et al. | |
| 9,333,107 B2 | 5/2016 | Potter et al. | |
| 9,345,606 B2 | 5/2016 | Bonutti et al. | |
| 9,408,771 B2 | 8/2016 | Branch et al. | |
| 9,445,966 B2 | 9/2016 | Bonutti et al. | |
| 9,468,578 B2 | 10/2016 | Bonutti et al. | |
| 9,572,702 B2 | 2/2017 | Bonutti et al. | |
| 9,610,038 B2 | 4/2017 | Branch et al. | |
| 9,669,249 B2 | 6/2017 | Marti et al. | |
| 9,744,091 B2 | 8/2017 | Branch et al. | |
| 9,744,092 B2 * | 8/2017 | Fu | A61H 1/0281 |
| 9,814,411 B2 | 11/2017 | Branch et al. | |
| 9,873,010 B2 | 1/2018 | Marti et al. | |
| 9,931,263 B2 | 4/2018 | Branch et al. | |
| 9,980,871 B2 | 5/2018 | Bonutti et al. | |
| 10,159,591 B2 | 12/2018 | Bonutti et al. | |
| 10,220,234 B2 | 3/2019 | Marti et al. | |
| 10,293,198 B2 * | 5/2019 | Marti | A63B 21/00181 |
| 10,307,319 B2 | 6/2019 | Bonutti et al. | |
| 10,383,578 B2 | 8/2019 | Branch et al. | |
| 10,456,314 B2 | 10/2019 | Bonutti et al. | |
| 10,603,240 B2 | 3/2020 | Branch et al. | |
| 10,667,938 B2 | 6/2020 | Bonutti et al. | |
| 10,765,901 B2 | 9/2020 | Radcliffe et al. | |
| 10,779,984 B2 | 9/2020 | Bonutti et al. | |
| 10,842,439 B2 | 11/2020 | Branch et al. | |
| 11,123,212 B2 | 9/2021 | Bonutti et al. | |
| 11,161,002 B2 | 11/2021 | Radcliffe et al. | |
| 11,712,389 B1 | 8/2023 | Branch et al. | |
| 2005/0197605 A1 | 9/2005 | Bonutti et al. | |
| 2005/0202943 A1 | 9/2005 | Branch et al. | |
| 2005/0273022 A1 | 12/2005 | Diaz et al. | |
| 2007/0062987 A1 | 3/2007 | Murakami | |
| 2007/0265634 A1 | 11/2007 | Weinstein | |
| 2009/0137369 A1 | 5/2009 | Branch et al. | |
| 2009/0143708 A1 | 6/2009 | Branch | |
| 2009/0264799 A1 * | 10/2009 | Bonutti | A61H 1/0274 601/5 |
| 2010/0010396 A1 | 1/2010 | Branch | |
| 2010/0229874 A1 | 9/2010 | Branch | |
| 2010/0288802 A1 | 11/2010 | Sakanishi | |
| 2011/0166489 A1 | 7/2011 | Angold et al. | |
| 2012/0143103 A1 | 6/2012 | Branch et al. | |
| 2013/0060171 A1 * | 3/2013 | Fu | A61H 1/00 601/5 |
| 2013/0237883 A1 * | 9/2013 | Malosio | A61H 1/0281 601/33 |
| 2014/0094721 A1 | 4/2014 | Diallo | |
| 2014/0358042 A1 | 12/2014 | Branch et al. | |
| 2015/0286117 A1 | 10/2015 | Sung et al. | |
| 2015/0297934 A1 | 10/2015 | Agrawal et al. | |
| 2015/0351990 A1 | 12/2015 | Ewing | |
| 2015/0360069 A1 | 12/2015 | Marti et al. | |
| 2017/0347963 A1 | 12/2017 | Branch et al. | |
| 2018/0133545 A1 | 5/2018 | Marti et al. | |
| 2018/0333096 A1 | 11/2018 | Branch et al. | |
| 2018/0333318 A1 | 11/2018 | Branch et al. | |
| 2019/0111299 A1 | 4/2019 | Radcliffe et al. | |
| 2019/0192370 A1 | 6/2019 | Branch et al. | |
| 2019/0343705 A1 | 11/2019 | Bonutti et al. | |
| 2019/0365329 A1 | 12/2019 | Branch et al. | |
| 2021/0038417 A1 | 2/2021 | Marti | |
| 2021/0038940 A1 | 2/2021 | Marti | |
| 2021/0038941 A1 | 2/2021 | Marti | |
| 2022/0175567 A1 | 6/2022 | Bonutti et al. | |
| 2023/0270613 A1 | 8/2023 | Dan et al. | |

OTHER PUBLICATIONS

DJO Global OptiFlex S Shoulder CPM Unit, DJO Global, downloaded from web page: <https://4mdmedical.com/catalog/product/view/id/284372/?CAWELAID=120141310000056386>, Download date: Aug. 20, 2020, original posting date: unknown, 2 pages.

* cited by examiner

MULTIPLE-JOINT THERAPY MACHINE

CROSS-REFERENCE TO RELATED APPLICATIONS

This application claims the benefit of priority under 35 USC § 119(e) of U.S. Provisional Patent Application No. 63/423,734 filed Nov. 8, 2022, the contents of which are incorporated herein by reference.

BACKGROUND OF THE DISCLOSURE

The present disclosure relates generally to a system or device for moving, exercising, or stretching a joint such as a shoulder, elbow, knee, or ankle of a user, and configurable for aligning with the joint for moving or exercising the same. The present disclosure more particularly relates to a device for imposing a variety of conditions, including but not limited to stretching conditions or movement across a selected range of motion, upon such a joint. This system or device will be referenced herein as a "multiple-joint therapy machine."

SUMMARY OF THE INVENTION

Briefly stated, a first example of a multiple-joint therapy machine may comprise a support frame and an indexing plate rotatably supported with respect to the support frame and releasably and non-rotatably securable with respect to the support frame. A rotatable base may be supported at a selectable height on the support frame, the rotatable base being configured to be releasably securable at a selectable angular orientation with respect to the indexing plate. A carrier link may be movably mounted with respect to the rotatable base and may be movable at least pivotably with respect to the rotatable base about a main axis. A geared hinge may connect the carrier link with respect to the rotatable base. The geared hinge may include: a main shaft non-rotatably attached with respect to the rotatable base; a sun gear non-rotatably attached to the main shaft; a planet carrier rotatably attached to the main shaft; a planet shaft rotatably mounted with respect to the planet carrier; and a planet gear non-rotatably mounted with respect to the planet shaft to rotate together with the planet shaft. The sun gear and the planet gear may be operatively engaged so that when the planet carrier is driven to rotate with respect to the sun gear, the planet gear rotates with respect to the sun gear while revolving about the sun gear. An actuator may be operatively connected to drive the carrier link at least pivotably with respect to the rotatable base about the main axis, the actuator having a first portion operatively connected with respect to the rotatable base, and a second portion operatively connected to the carrier link. A body carrier may be mounted on the carrier link. A controller may be operatively connected to activate the actuator to urge the carrier link and the body carrier to move at least pivotably with respect to the rotatable base.

In a second example, a multiple-joint therapy machine may comprise a support frame and a planet-gear assembly mounted to the support frame. The planet-gear assembly may include: a main shaft non-rotatably attached to the support frame and defining a main shaft axis; a sun gear non-rotatably attached to the main shaft; a planet carrier rotatably attached to the main shaft; a planet shaft rotatably mounted to the planet carrier and defining a planet axis; and a planet gear non-rotatably mounted with respect to the planet shaft to rotate together with the planet shaft. The sun gear and the planet gear may be operatively engaged so that when the planet carrier is driven to rotate with respect to the sun gear, the planet gear rotates with respect to the sun gear while revolving about the sun gear. A drive hub may be rotatably supported with respect to the planet shaft, the drive hub being configured to be releasably securable at a selectable angular orientation with respect to the planet gear. A carrier link may be operatively connected to and driven by the drive hub. An actuator may be operatively connected to drive the planet carrier at least pivotably with respect to the main shaft about the main shaft axis. The actuator may have a first portion operatively connected with respect to the support frame and a second portion operatively connected to the planet carrier. A body carrier may be mounted on the carrier link. A controller may be operatively connected to activate the actuator to urge the planet carrier, the carrier link, and the body carrier to move at least pivotably with respect to the support frame.

BRIEF DESCRIPTION OF THE SEVERAL VIEWS OF THE DRAWINGS

The following detailed description will be better understood when read in conjunction with the appended drawings. For the purpose of illustrating the invention, there are shown in the drawings various embodiments, including embodiments which may be presently preferred. It should be understood, however, that the invention is not limited to the precise arrangements and instrumentalities shown. In the drawings.

DETAILED DESCRIPTION OF THE INVENTION

Figure 1:
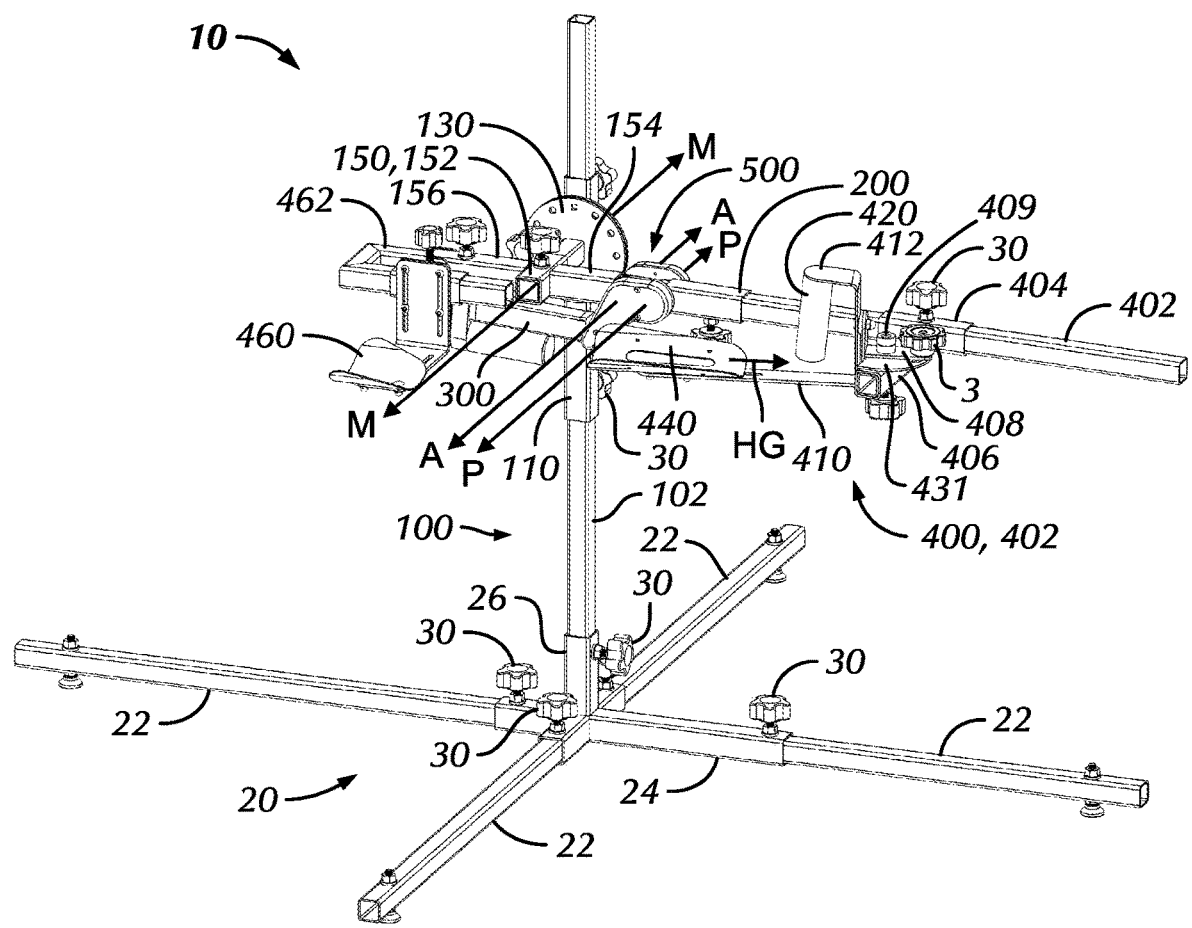
FIG. 1 is a front right perspective view of a multiple-joint therapy machine, configured to manipulate a left shoulder of a user, with the various elements thereof in a configuration with an included linear actuator in a retracted configuration, according to a first embodiment of the present disclosure.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of an object and designated parts thereof. Unless specifically set forth otherwise herein, the terms "a," "an," and "the" are not limited to one element but instead should be read as meaning "at least one." "At least one" may occasionally be used for clarity or readability, but such use does not change the interpretation of "a," "an," and "the." Moreover, the singular includes the plural, and vice versa, unless the context clearly indicates otherwise. As used herein, the terms "proximal" and "distal" are relative terms referring to locations or elements that are closer to (proximal) or farther from (distal) with respect to other elements, the user, or designated locations. "Including" as used herein means "including but not limited to." The word "or" is inclusive, so that "A or B" encompasses A and B, A only, and B only. The terms "about," "approximately," "generally," "substantially," and like terms used herein, when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit thereof. "At least pivoting movement," "mounted for at least pivoting movement," and "at least pivotal connection," and similar phrases, used with respect to two elements, mean that the elements are configured or attached for movement with respect to each other, with the movement encompassing pivoting alone or pivoting in combination with another type of relative movement such as, for example, sliding and/or revolution at a distance about a common axis. The terminology set forth in this paragraph includes the words noted above, derivatives thereof, and words of similar import. The devices and methods disclosed herein are disclosed as imposing a movement or a load upon a shoulder, an elbow, or an arm of a user, or upon a leg, a knee, a hip, or an ankle of a user. From the standpoint of the disclosed devices and methods, any mechanism, configuration, or step involving imposing a desired load is interchangeable with the same mechanism, configuration, or step used to impose a desired movement; and any mechanism, configuration, or step involving imposing a desired movement is interchangeable with the same mechanism, configuration, or step used to impose a desired load.

In one aspect, referring to FIGS. 1-13, a first embodiment of a multiple-joint therapy machine 10 is disclosed in various configurations for addressing different joints of the user; where components are substituted or re-oriented as discussed herein, the "configurations" might alternatively be considered to be different embodiments of the multiple-joint therapy machine, particularly where components are substituted.

Figure 2:
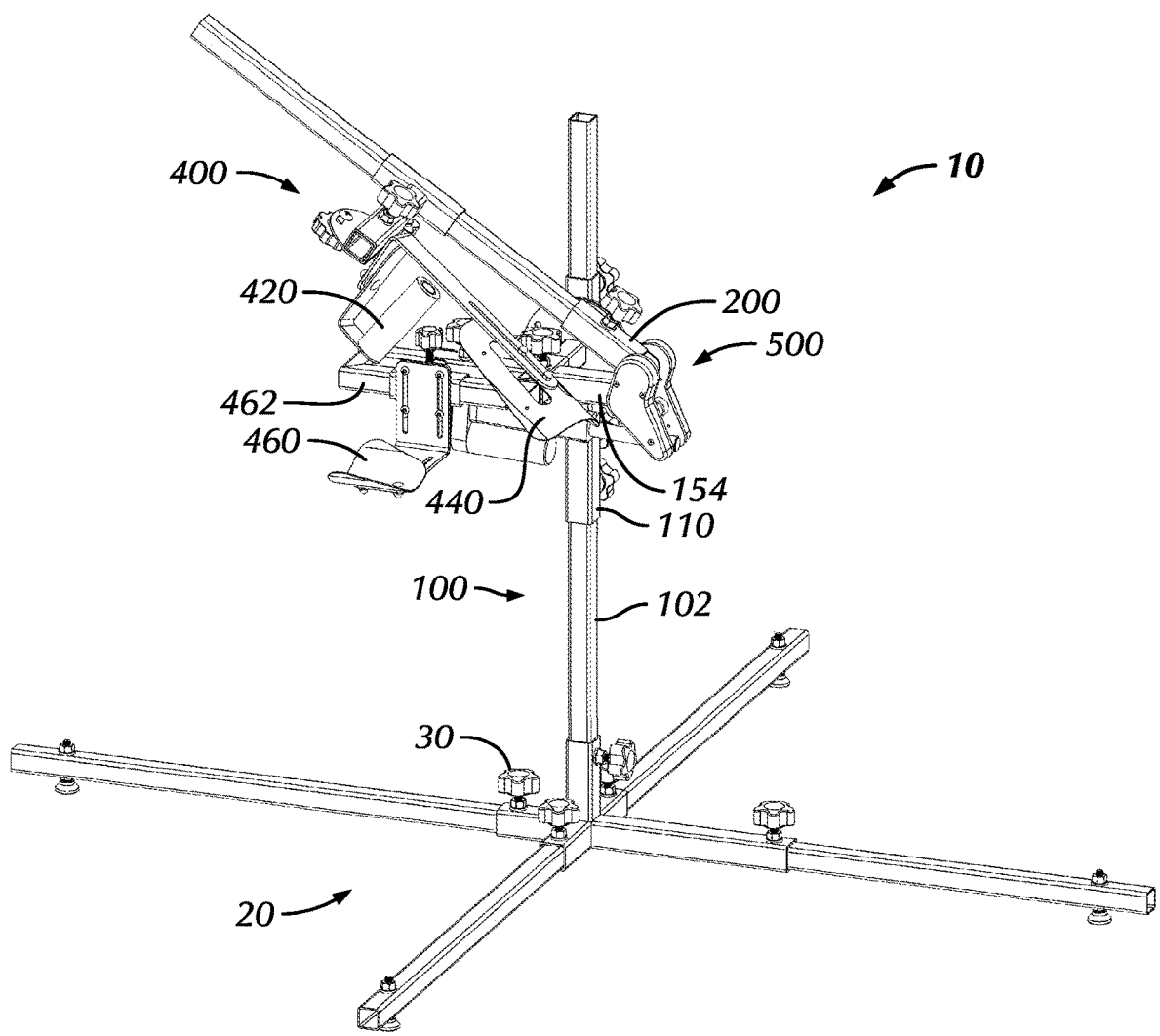
FIG. 2 is a front right perspective view of the multiple-joint therapy machine of FIG. 1 configured to manipulate a left elbow of a user, with the various elements thereof in a configuration with the included linear actuator in an extended configuration, shown mounted on a non-rolling stand.

Referring to FIGS. 1 and 2, the multiple-joint therapy machine 10 includes a support frame 100, which may in turn include a base, which may take the form of a base frame 20 with transversely extending legs 22. The legs 22 may telescopically engage and may be secured to a central body 24, which may define an orthogonal shape, by knobs 30. Each knob 30 may comprise a hand grip 30a fixed non-rotatably with respect to a shaft portion 30b with external threads, such that the shaft portion 30b of the knob 30 may engage a threaded opening and may be tightened to secure elements of the device in a conventional manner. The hand grip 30a and the shaft portion 30b are called out specifically in FIG. 11; knobs 30 are called out in FIG. 1 and appear throughout FIGS. 1-23. Thus the legs 22, for example, may be removably attached to the central body 24 and releasably securable by way of knobs 30. Note that the base frame 20 is compatible with the embodiments of the multiple-joint therapy machine, as shown in FIGS. 14-27 and as discussed below.

Figure 7:
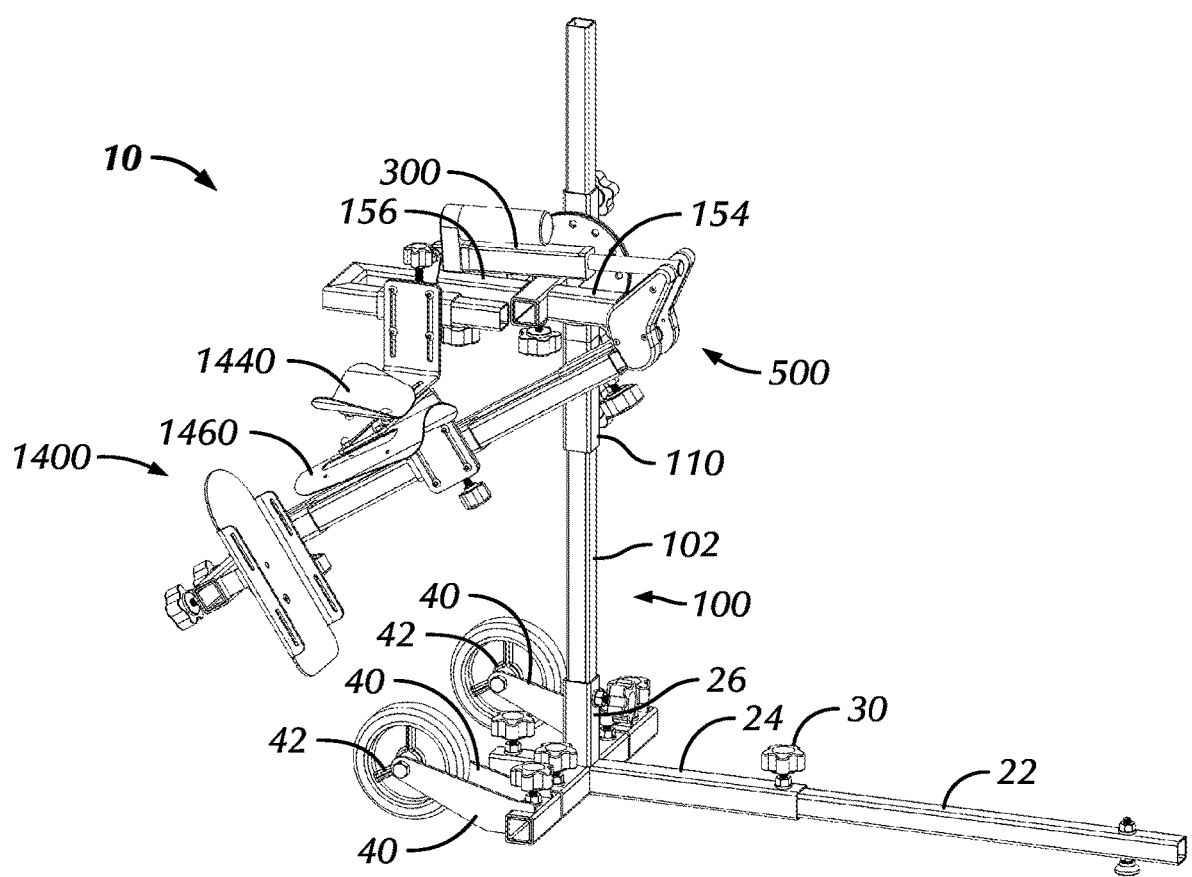
FIG. 7 is a front right perspective view of the multiple-joint therapy machine of FIG. 1 configured to manipulate a left knee of a user, with the various elements thereof in a configuration with the included linear actuator in an extended configuration, according to the embodiment of FIG. 1, but substituting a mobile, rolling stand for the non-rolling stand of FIG. 1.

Referring to FIG. 7, a rollable form of a support frame 100 may include the base frame 20, which may include the central body 24, which may be attached to one or more wheel supports 40 with wheels 42 attached thereto, and with a leg 22 extending opposite the wheels 42.

Referring to FIG. 1 (but common to certain embodiments disclosed herein), the support frame 100 may include a vertical support that may be attached to the base frame 20. The vertical support may take the form of a support post 102, which as in the illustrated embodiment may be telescopically received in a socket 26 fixed to and extending vertically upward from the central body 24. In the illustrated embodiment, the support post 102 is tubular, engages the socket 26 telescopically, and is removably attached and secured to the central body 24 by a knob 30. A base link in the form of a rotatable base 150 is mounted on the support post 102 and may be fixed at a selected height along the support post 102. The rotatable base 150 is mounted and supported at an adjustable height on the support post 102 of the support frame 100. The rotatable base 150 is releasably securable at a selectable angular orientation with respect to the support post 102 and thus with respect to the support frame 100 and is alignable in relation of a joint of a user by adjustment of a vertical position of the indexing plate 130 in combination with adjustment of the position of the joint of the user. A pivoting link in the form of a carrier link 200 is at least pivotably mounted (as defined above) to the rotatable base 150 for at least pivoting motion with respect to a main axis A, which may be horizontal. An actuator, which in the illustrated embodiment takes the form of a linear actuator 300 with a proximal portion or first portion 302 and a distal portion or second portion 304, is configured and operatively connected to drive the carrier link 200 in at least pivoting movement with respect to the rotatable base 150 about the main axis A.

The carrier link 200 may be at least pivotably connected to the rotatable base 150 by a geared hinge 500, as disclosed below.

The multiple-joint therapy machine 10 may further comprise a user-engagement assembly, which may include a body carrier 400 configured to engage one or more body parts of a user. The body carrier 400 may be mounted on the carrier link 200 and may include any of various user-engagement assemblies, which will be described below and are shown throughout the drawings. The body carrier 400 is attachable to the carrier link 200 and may be attachable to the rotatable base 150, as well as to a body of a user. A controller 1000 (FIG. 28) may be operatively connected, either by conventional wiring or wirelessly, to activate the linear actuator 300 to urge the carrier link 200 and the body carrier 400 to move at least pivotably with respect to the rotatable base 150. The controller 1000 may be a simple switch configured to provide power to selectively extend or retract or otherwise operate the linear actuator 300; or the controller 1000 may encompass a microprocessor, micro controller, or other device capable of executing instructions and thereby extending, retracting, or otherwise operating the linear actuator 300.

By the various configurations and user-engagement assemblies disclosed herein, the multiple-joint therapy machine 10 is configurable for addressing various joints of a patient. The multiple-joint therapy machine 10 is configurable to align the rotatable base 150 and the carrier link 200 in relation with a joint of the user, so that an axis P of at least pivoting movement between the rotatable base 150 and the carrier link 200 may be aligned with a joint of the user (as discussed below). The multiple-joint therapy machine 10 may be configurable so that the linear actuator 300 may drive the carrier link 200 and attached user-engagement assemblies in at least pivoting movement with respect to the rotatable base 150, thus imposing movement or a load upon a joint of the user. The multiple-joint therapy machine 10 is so configurable by attaching various combinations of user-engagement assemblies to the rotatable base 150 and/or to the carrier link 200; by varying the height at which user-engagement assemblies are supported on the support post 102; by varying an angular orientation of the user-engagement assemblies (in a setup operation, prior to moving or loading the joint of the user); and by placing the user in a variety of positions and a variety of relationships to the multiple-joint therapy machine 10 using a chair, a table, or the like.

Examples of these configurations, and of user-engagement assemblies for placing the multiple-joint therapy machine 10 in various configurations, will be discussed further below. Examples of configurations are shown in FIGS. 1-8 of the drawings, with embodiments of the user-engagement assemblies and the multiple-joint therapy machine 10 being shown throughout FIGS. 1-8 of the drawings. The multiple-joint therapy machine 10 thus is compatible with a user who may be supported in a variety of positions and orientations. In some embodiments, the available user-engagement assemblies and configurations of the multiple-joint therapy machine 10 may allow the multiple-joint therapy machine 10 to be used with the user in a seated position, a standing position, a supine position (lying on a table), or a prone position (also lying on an table) and to adjust the multiple-joint therapy machine 10 to align the movement thereof with a joint of the user being addressed by use of the multiple-joint therapy machine 10. The relationship between the position of the user and the multiple-joint therapy machine 10 may in turn operate to vary the movement or load imposed upon a selected joint of the user.

In each embodiment or configuration of FIGS. 1-13, a rotatable base 150 is mounted on support post 102 and may be fixed at a selected height along the support post 102. Referring to FIG. 1, a movable base in the form of a sliding collar 110 axially and slidably engages the support post 102 and is securable to the support post 102 at a selectable height by two knobs 30.

Figure 11:
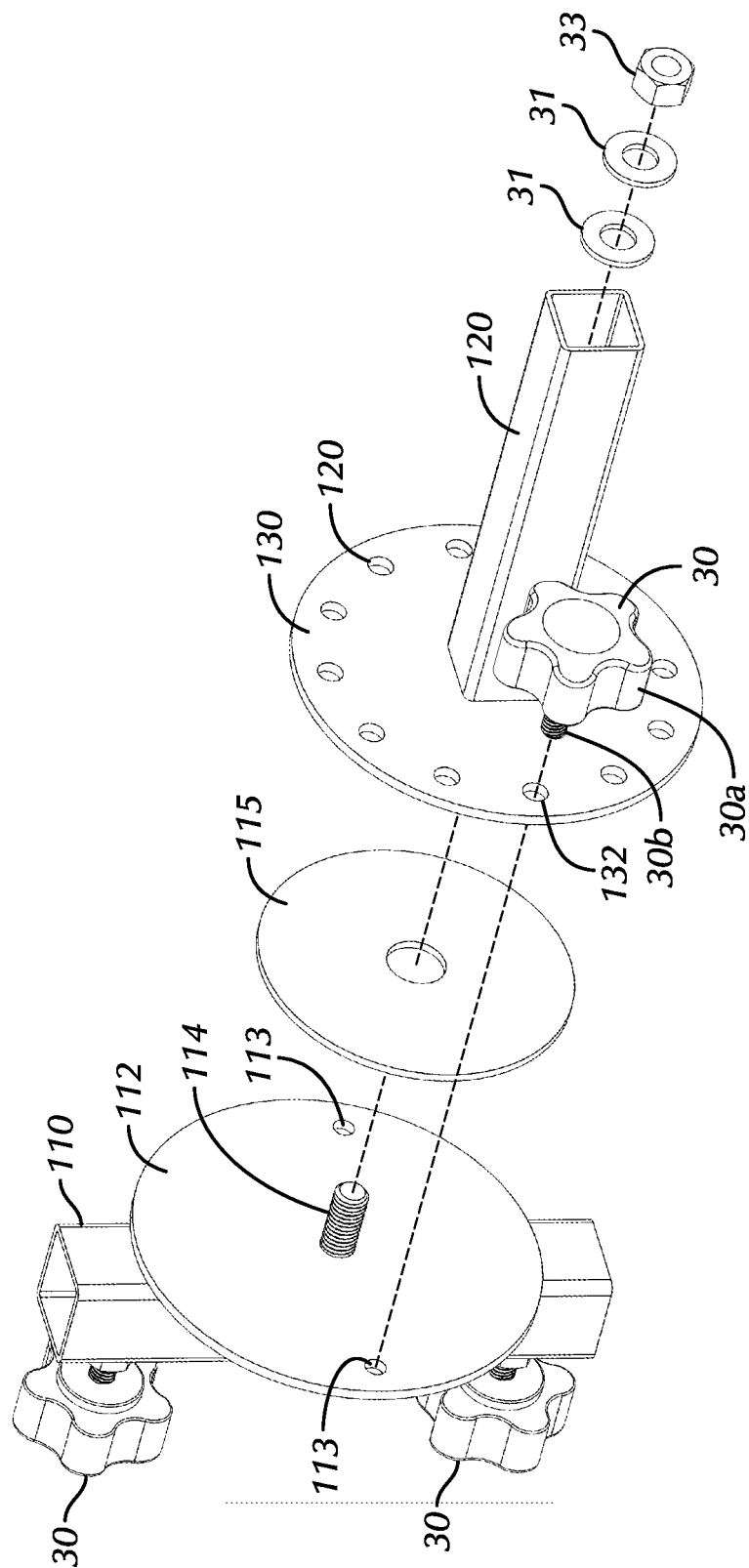
FIG. 11 is an exploded, partial front right perspective view of the multiple-joint therapy machine of FIG. 1, focused on elements of the indexing plate and related components.

FIG. 11 is an exploded perspective detail view of an embodiment of an assembly for mounting the rotatable base 150 to the support post 102. Referring to FIG. 11, the sliding collar 110 has a back plate 112. A support shaft 114, which in the illustrated embodiment has external threads, may be fixed thereto. The back plate 112 has at least one back-plate hole 113 (two are shown) for engaging a shaft portion 30$b$ of a knob 30, which has a hand grip 30$a$. A master link 120 may be rotatably mounted on the support shaft 114 and secured thereto by, for example, two washers 31 and a nut 33. The master link 120 may be fixed to an indexing plate 130, which may be circular and may have a plurality of indexing holes 132; the indexing holes 132 may be spaced along a perimeter thereof. The indexing plate 130 is rotatably mounted on the support shaft 114 to define a master-link rotation axis M. The master link 120 may be centered on the indexing plate 130 so that when the indexing plate 130 rotates on the support shaft 114, the master link 120 rotates on the master-link rotation axis M. When the master link 120 and the indexing plate 130 are in a mounted configuration, the indexing plate 130 may be positioned adjacent to or proximal to the back plate 112 so that a shaft portion 30$b$ of a knob 30 may engage both an indexing hole 132 and a back-plate hole 113. The indexing holes 132 are alignable with each of the back-plate holes 113 by rotating the master link 120 and the indexing plate 130 together on the support shaft 114. The master link 120 and the indexing plate 130 may be rotated to a selected orientation and then secured in place by engaging at least one knob 30 to both a back-plate hole 113 and an indexing hole 132. A spacer 115 may be installed on the support shaft 114 between the back plate 112 and the indexing plate 130 to aid in smooth movement of the assembly, and/or to act as a cushion between the back plate 112 and the indexing plate 130. The spacer 115 may preferably be formed from HDPE or other polymer material.

The rotatable base 150 may be mounted on the master link 120 to rotate or pivot with the master link 120 so that the rotatable base 150 may be fixed at any of several selectable angular orientations with respect to the support post 102 by fixing the angular orientation of the indexing plate 130 and the attached master link 120 using the mechanism described above. Because the master link 120 supports the rotatable base 150 and a user-engagement assembly (as discussed further herein), when the user-engagement assembly is attached to the master link 120 by way of the carrier link 200 and the rotatable base 150, the mechanism described herein allows selection of an orientation of the user-engagement assembly and thus control of a start point or an end point of a range of motion that is available with the user-engagement assembly. This is so because a geared hinge 500, discussed below, has a range of motion constrained by geometry and by a stroke length of the linear actuator 300.

Figure 8:
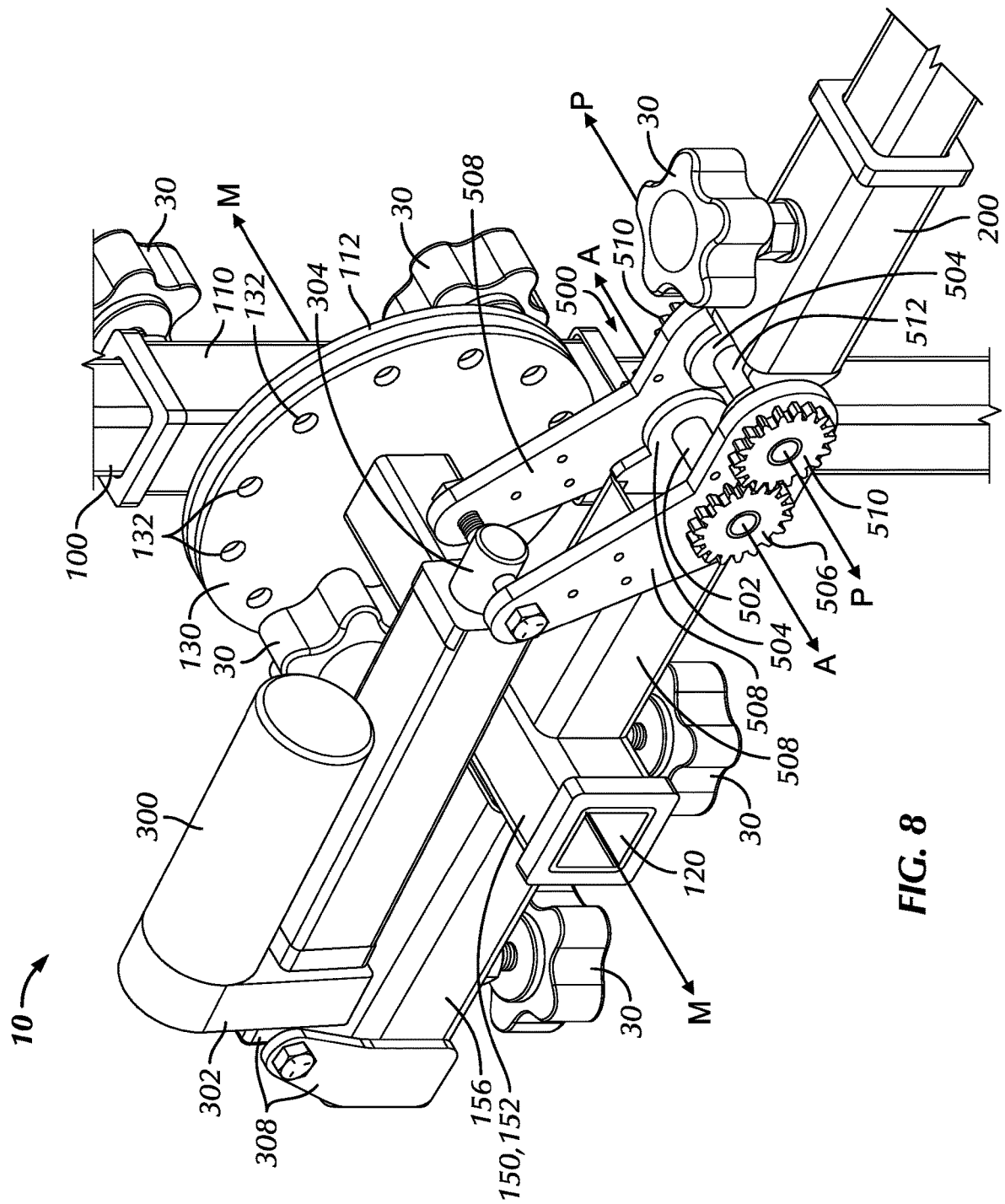
FIG. 8 is a magnified, partial front right perspective view of the multiple-joint therapy machine of FIG. 1 configured to manipulate a left knee of a user, with the various elements thereof in a configuration with the included linear actuator in a retracted configuration, focused on elements of the drive mechanism thereof.
Figure 9:
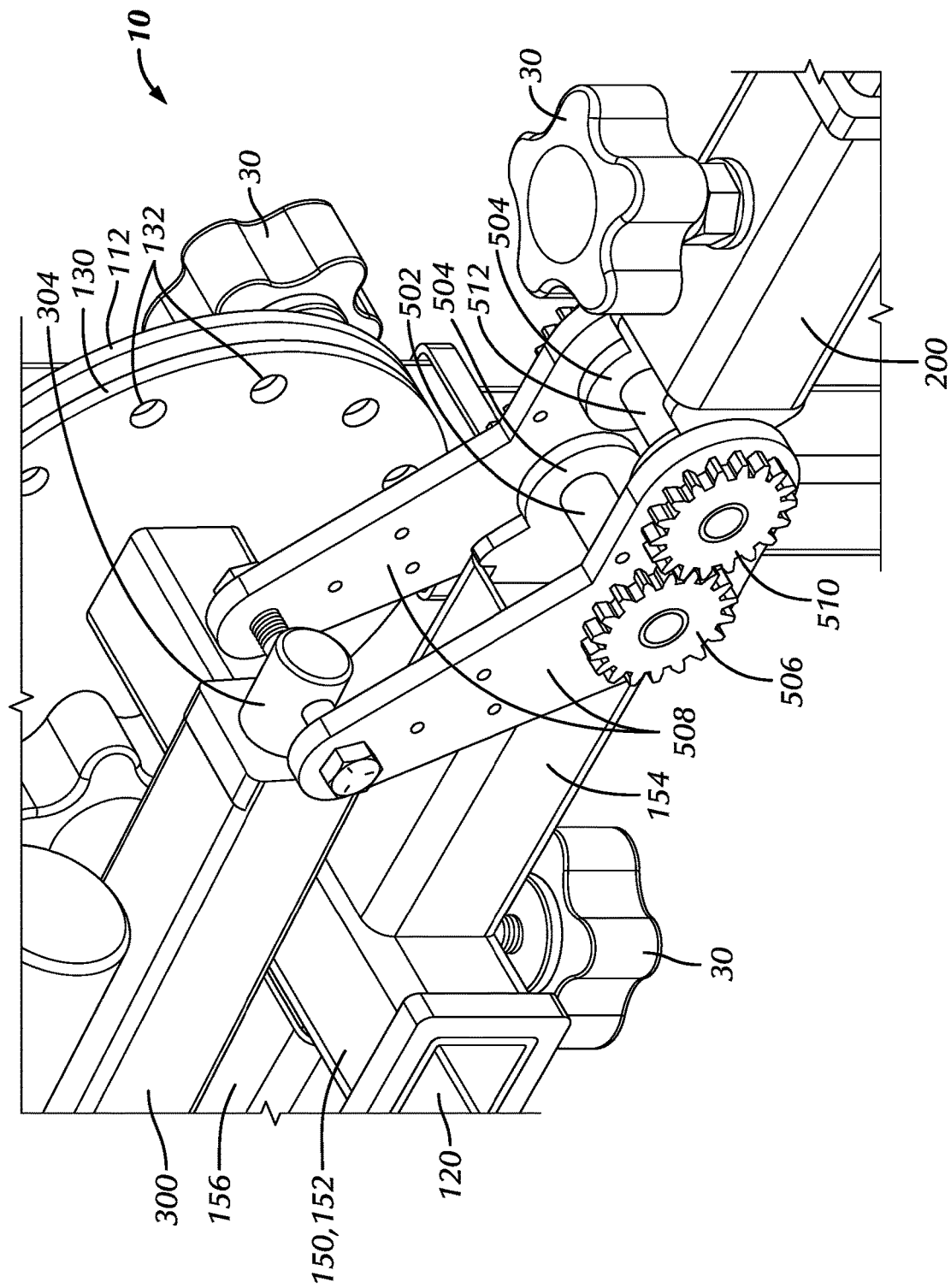
FIG. 9 is a magnified, partial front right perspective view of the multiple-joint therapy machine of FIG. 1, further magnified in comparison to FIG. 8, the multiple-joint therapy machine being configured to manipulate a left knee of a user, with the various elements thereof in a configuration with the included linear actuator in a retracted configuration, focused on elements of the drive mechanism thereof, with certain elements omitted to show the drive mechanism more clearly.
Figure 10:
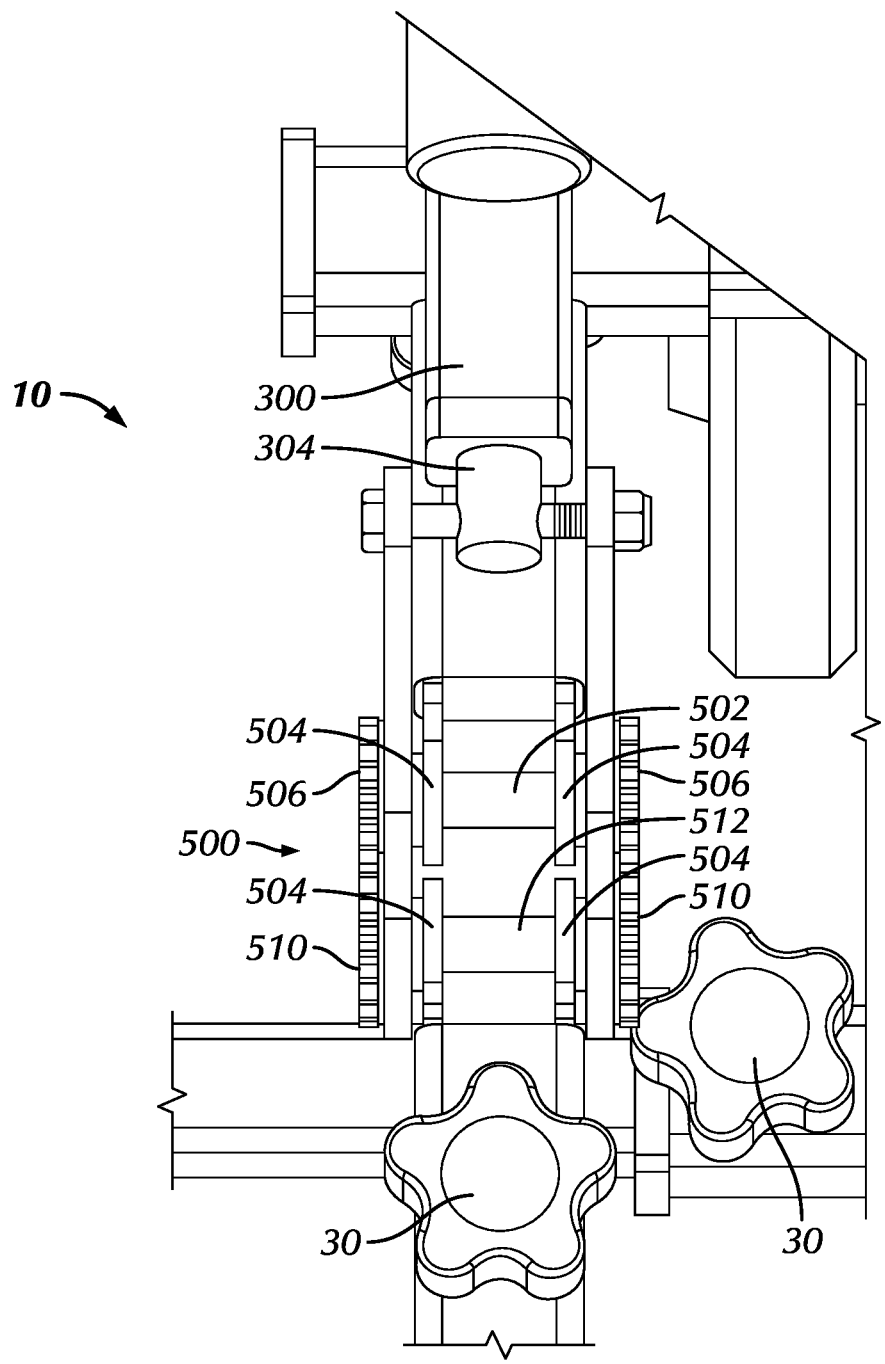
FIG. 10 is a magnified, partial upper perspective view of the multiple-joint therapy machine of FIG. 1 configured to manipulate a left knee of a user, with the various elements thereof in a configuration with the included linear actuator in a retracted configuration, focused on elements of the drive mechanism thereof, with certain elements omitted to show the drive mechanism more clearly.

In the embodiment of FIGS. 1-13, and as best seen in FIGS. 1-4 and 8-10, the carrier link 200 is connected to the rotatable base 150 for at least pivoting movement with respect to the rotatable base 150 by the geared hinge 500. Referring to FIGS. 8-10, the geared hinge 500 and connected components are shown in magnified views. The rotatable base 150 is mounted on the master link 120, with the rotatable base 150 having a central tube 152 fitted onto the master link 120 in alignment or substantial alignment with the master-link rotation axis M by being slid onto the master link 120 and secured in place. In the illustrated embodiments, the master link 120 and the central tube 152 may have non-round cross sections. The master link 120 and the rotatable base 150 may be engageable and securable to rotate together, without relative rotation. The rotatable base 150 also has a hinge-mount portion 154 extending transversely to the central tube 152 and radially outwardly therefrom in a first direction, and a fixed-mount portion 156 extending in a second direction opposite the first direction. The fixed-mount portion 156 is connected to the first portion 302 of the linear actuator 300 by mounting plates 308. The geared hinge 500, which forms an at least pivotal connection (as defined above) between the rotatable base 150 and the carrier link 200, and the hinge-mount portion 154 of the rotatable base 150, are operatively connected to the second portion 304 of the linear actuator 300.

The rotatable base 150 is reversibly mountable upon the master link 120. In a first mounting configuration of the rotatable base 150, the rotatable base 150 may be mounted on the master link 120 so that when the hinge-mount portion 154 and the fixed-mount portion 156 are horizontal, with the hinge-mount portion 154 to the right of the central tube 152 and the fixed-mount portion 156 to the left of the central tube 152, the linear actuator 300 is located below the hinge-mount portion 154 and the fixed-mount portion 156. In the first mounting orientation, the linear actuator 300 is located clockwise with respect to the fixed-mount portion 156. The first mounting orientation is shown in FIGS. 1-12 and is suitable for addressing a left-side joint of a user. In a second mounting configuration of the rotatable base 150, the rotatable base 150 may be mounted on the master link 120 so that when the hinge-mount portion 154 and the fixed-mount portion 156 are horizontal, with the hinge-mount portion 154 to the left of the central tube 152 and the fixed-mount portion 156 to the right of the central tube 152, the linear actuator 300 is located above the hinge-mount portion 154 and the fixed-mount portion 156, clockwise from the fixed-mount portion 156. In the second mounting orientation, the linear actuator 300 is located counterclockwise with respect to the fixed-mount portion 156. The second mounting orientation is suitable for addressing a right-side joint of a user. This reversible arrangement is accomplished because the central tube 152 of the rotatable base 150 may engage the master link 120 from either end of the central tube 152.

The hinge-mount portion 154 is tubular and has a square cross-section (other shapes are practical) with a pair of collars 504 fixed thereto. A main shaft 502 is non-rotatably attached with respect to the rotatable base 150 by being attached, for example, to the collars 504. The geared hinge 500 may include a sun gear 506 (two are shown), with each sun gear 506 being non-rotatably attached to the main shaft 502 (for example, to end portions of the main shaft 502), with the result being that the sun gears 506 are non-rotatably attached to the rotatable base 150 and in particular are non-rotatably attached to the hinge-mount portion 154 thereof. The geared hinge 500 may include a planet carrier comprising one or two carrier plates 508, which may be rotatably attached to the main shaft 502 in parallel and spaced relation to one another to rotate together about the main shaft 502. The carrier plates 508 may be joined by screws, pins, or another suitable connection. Together the carrier plates 508, together with any such connection, may be considered to form a carrier body. At least one carrier plate 508 may be connected to the distal portion or second portion 304 of the linear actuator 300, with a location of connection being offset from the main shaft 502, so that extension or contraction of the linear actuator 300 rotates the carrier plates 508 about a main axis A of the main shaft 502, which may be a horizontal axis. A planet shaft 512 may extend between the carrier plates 508 and may be rotatably mounted with respect to the carrier plates 508 and the carrier body formed thereby. The planet shaft 512 may include a shoulder or other structure to hold the carrier plates 508 in spaced relation to one another; alternatively, another structural element such as a tubular spacer may be employed to do so. A planet gear 510 (two are shown) may be non-rotatably mounted with respect to the planet shaft 512; and each of the two planet gears 510 thus may be non-rotatably mounted with respect to the other planet gear 510, while being rotatably mounted with respect to the carrier plates 508 and the carrier body formed thereby. Each planet gear 510 may be engaged with and may mesh with a corresponding one of the sun gears 506. The carrier link 200 may also be non-rotatably mounted to the planet shaft 512 by one or more collars 504 (two collars are shown), and may be welded or otherwise fixed to the collars 504. When the linear actuator 300 extends or contracts, the force of the linear actuator 300, acting at a distance from the main shaft 502, may apply a torque causing the carrier plates 508 to rotate about the main shaft 502; and the meshing of the sun gears 506 with the planet gears 510 may cause the planet gears 510, the planet shaft 512, and ultimately the carrier link 200 (and any components fixed thereto) to rotate about a planet axis P of the planet shaft 512. The planet shaft 512, in addition to rotating about the planet axis P, may revolve following an essentially radial path about the main axis A, with the radius of the path being the sum of the radii of the sun gears 506 and the planet gears 510, providing an additional component of movement of the carrier link 200 (and attached components) as compared to a pure rotational or pivoting movement. The resulting movements of the user-engagement assemblies, each including the respective body carrier 400, 1400, may be and preferably are compatible with movement of a human elbow, shoulder, or knee.

The multiple-joint therapy machine 10 thus is configured to allow the height and angular orientation of the rotatable base 150 to be selected and then fixed. The configuration of the geared hinge 500 may provide an angular range of motion of about 140 degrees between the rotatable base 150 and the carrier link 200. The master link 120 provides rotation about the master-link rotation axis M, which allows selection a starting angle and an ending angle through which the carrier link 200 may undergo at least pivoting motion with respect to the rotatable base 150 and in particular with respect to the hinge-mount portion 154 thereof. This enables the multiple-joint therapy machine 10 to rotate user-engagement assemblies, carried by the rotatable base 150, through a variety of starting and ending angles (within the range-of-motion limits of the geared hinge 500).

Referring to FIGS. 1 and 2, in the first mounting configuration of the rotatable base 150 on the master link 120, the rotatable base 150 is secured in a substantially horizontal orientation, with the carrier link 200 also horizontal when the linear actuator 300 is fully retracted. Upon extension of the linear actuator 300, the carrier link 200 moves counterclockwise (as viewed in FIGS. 1 and 2) to move the user's elbow joint from an extended position to a flexed position.

Figure 3:
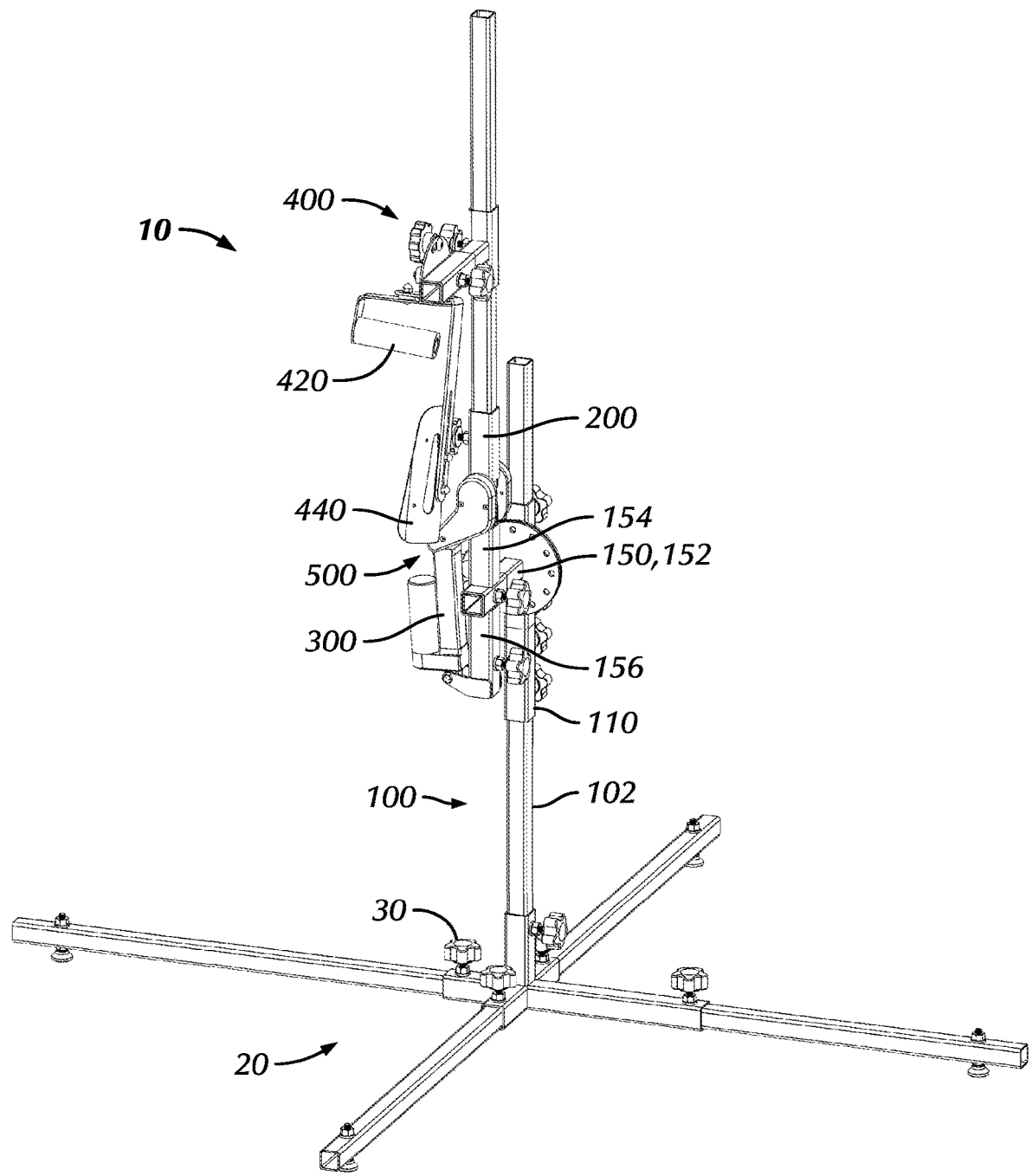
FIG. 3 is a front right perspective view of the multiple-joint therapy machine of FIG. 1 configured to manipulate a left shoulder of a user, with the various elements thereof in a configuration with the included linear actuator in a retracted configuration.
Figure 4:
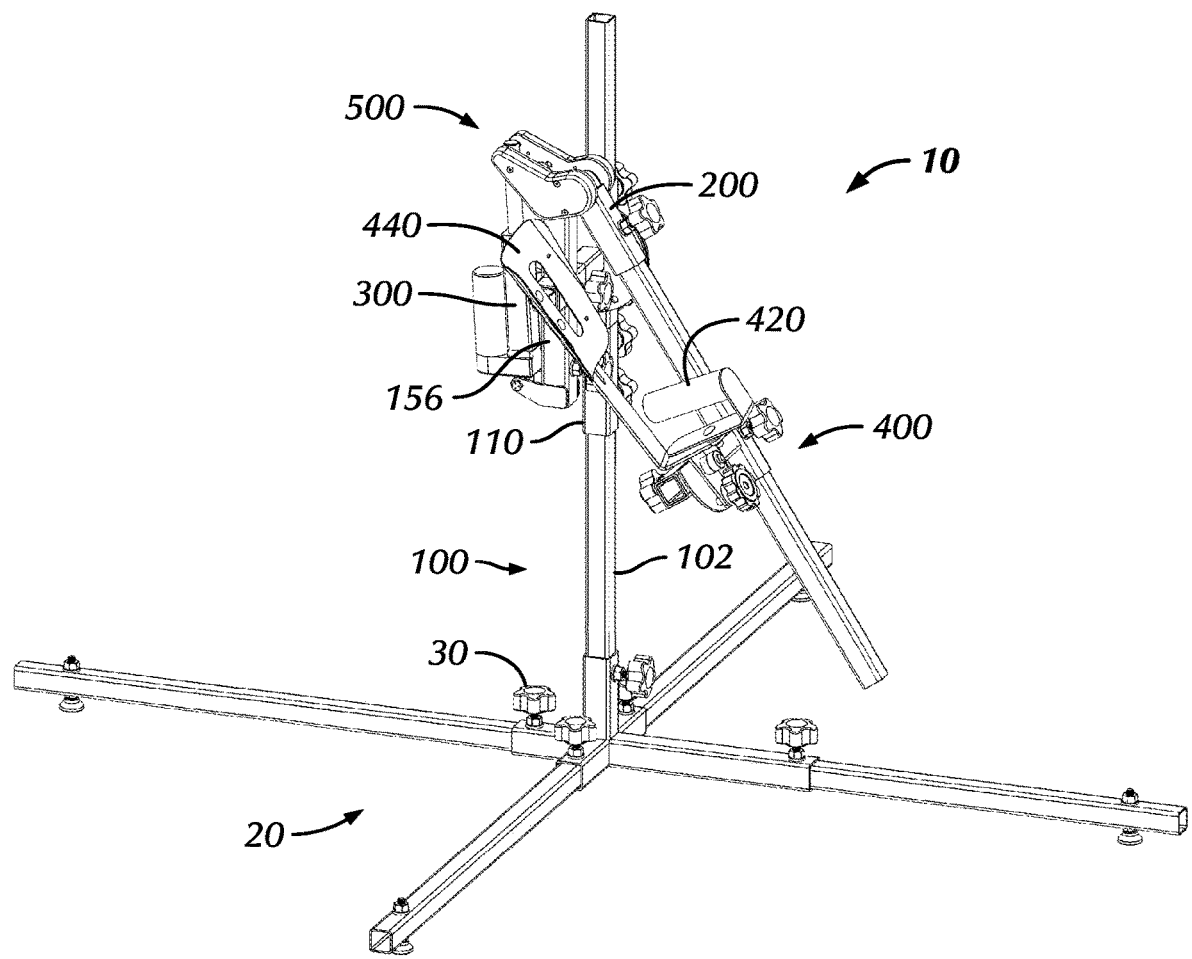
FIG. 4 is a front right perspective view of the multiple-joint therapy machine of FIG. 1 configured to manipulate a left shoulder of a user, with the various elements thereof in a configuration with the included linear actuator in an extended configuration.

Referring to FIGS. 3 and 4, the rotatable base 150 is secured in a substantially vertical orientation with the carrier link 200 also vertical when the linear actuator 300 is fully retracted; and upon extension of the linear actuator 300, the carrier link 200 moves clockwise (as viewed in FIGS. 3 and 4) to move the user's shoulder joint from an extended position to a flexed position (in horizontal abduction). Alternatively, the shoulder of the user may be addressed by a configuration in which a base link may be secured in a substantially horizontal orientation with a pivoting link also horizontal when the linear actuator 300 is fully retracted, as shown in FIGS. 1-2.

Figure 5:
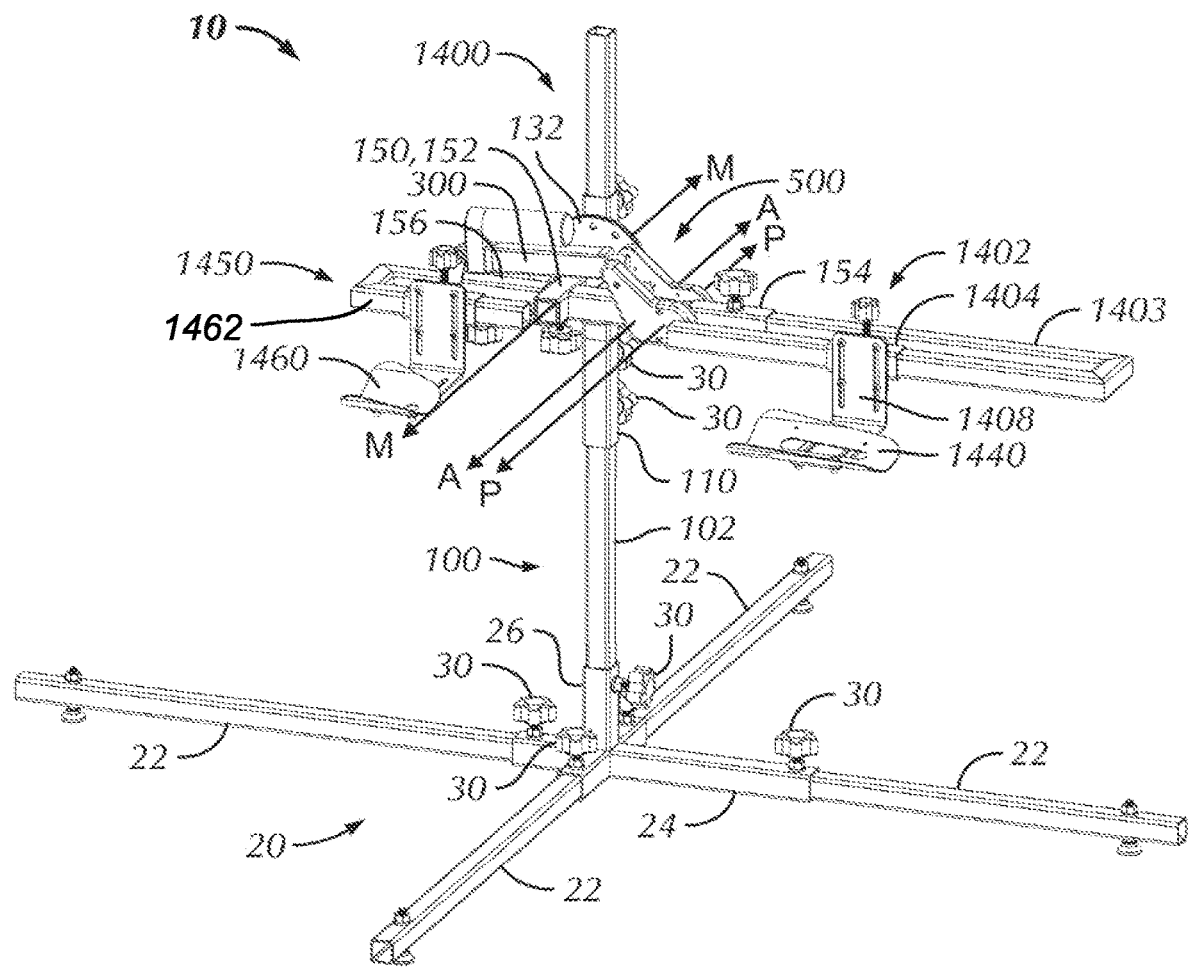
FIG. 5 is a front right perspective view of the multiple-joint therapy machine of FIG. 1 configured to manipulate a left knee of a user, with the various elements thereof in a configuration with the included linear actuator in a retracted configuration, according to the embodiment of FIG. 1.
Figure 6:
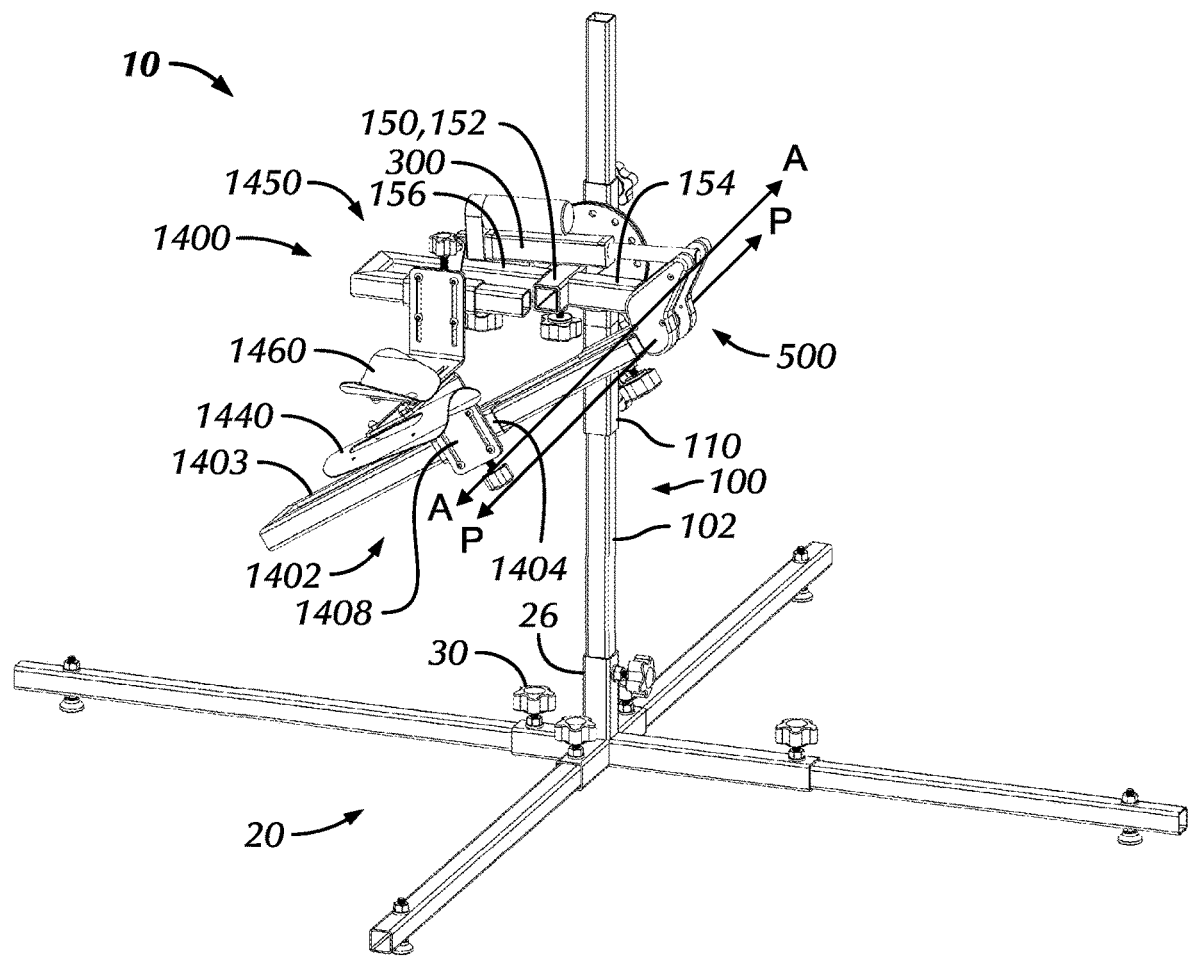
FIG. 6 is a front right perspective view of the multiple-joint therapy machine of FIG. 1 configured to manipulate a left knee of a user, with the various elements thereof in a configuration with the included linear actuator in an extended configuration.

Referring to FIGS. 5 and 6, the rotatable base 150 is secured in a substantially horizontal orientation, with the carrier link 200 also horizontal when the linear actuator 300 is fully retracted. Upon extension of the linear actuator 300, the carrier link 200 moves clockwise (as viewed in FIGS. 5 and 6) to move the user's knee joint from an extended position to a flexed position.

The multiple-joint therapy machine 10 is usable with any of a plurality of user-engagement assemblies and may form a system including one or more of the user-engagement assemblies. Referring to FIGS. 1-4, a body carrier 400 for engaging an arm, elbow, or shoulder of a user may include a pivoting frame portion 402 removably attachable to the carrier link 200. The pivoting frame portion 402 engages the carrier link 200 telescopically and is secured thereto by a knob 30. The pivoting frame portion 402 includes a movable and securable base link in the form of a sliding collar 404, the sliding collar 404 being slidable along the pivoting frame portion 402 and securable along a length thereof to accommodate the user and a selected configuration. A transverse link 406 extends transversely from the sliding collar 404 and has attached thereto a pivoting base 408, which is pivotable about a vertical axis passing through a mounting bolt 409 and securable in a selected orientation by a knob 30, which threadedly engages a plate 431. The pivoting base 408 in turn supports a pivoting link 410 extending therefrom. The pivoting link 410 supports supporting a lower-arm platform 440 and a hand grip 420 extending transversely thereto. The pivoting link 410 may have a hand grip support 412 attached thereto, with a hand grip 420 mounted on the hand grip support 412. The pivoting link 410, the hand grip 420, and the lower-arm platform 440 may be mounted pivotably with respect to the transverse link 406 to allow the hand grip 420 (as well as the lower-arm platform 440) to rotate or pivot about a hand-grip axis HG (FIG. 1). A fixed-frame portion may comprise a proximal platform 460 attached to the fixed-mount portion 156 of the rotatable base 150. The proximal platform 460 may be supported by a support rail 462, which may be generally U- shaped and may have two offset, parallel portions so that the proximal platform 460 may be offset outwardly from the linear actuator 300 and may be removably engaged and secured with respect to the fixed-mount portion 156 of the base link 160 at a selected longitudinal position with respect to the fixed-mount portion 156. The proximal platform 460 and/or the support rail 462 may not be needed for any or all movement or loading of the arm, elbow, or shoulder and may be removed if not needed. The support rail 462 may be removed from the fixed-mount portion 156, rotated about a lengthwise axis SR thereof, and re-installed in the fixed-mount portion 156 to allow the proximal platform 460 to be oriented away from the support post 102 and toward the user when reconfiguring between the first mounting configuration of the rotatable base 150 and the second mounting configuration of the rotatable base 150 (discussed above).

In the configurations of FIGS. 1 and 2, the multiple-joint therapy machine 10 is configured with the linear actuator 300 contracted and the rotatable base 150 oriented horizontally, with the hinge-mount portion 154 and the fixed-mount portion 156 extending horizontally. The linear actuator 300 is positioned below the rotatable base 150, allowing the linear actuator 300 to extend to drive the carrier link 200 (and connected elements) clockwise (as seen in FIGS. 1 and 2) and generally upwardly to impose a desired load or movement on the elbow joint of the user.

Referring to FIGS. 3 and 4, the rotatable base 150 is secured in a substantially vertical orientation, with the carrier link 200 also oriented vertically and extending upwardly when the linear actuator 300 is fully retracted. Upon extension of the linear actuator 300, the carrier link 200 moves clockwise (as viewed in FIGS. 3 and 4) to impose a desired load or movement on the shoulder joint of the user.

In the configurations of FIGS. 5 and 6, the rotatable base 150 is secured in a substantially horizontal orientation, with the carrier link 200 also horizontal when the linear actuator 300 is fully retracted. The linear actuator 300 is positioned below the rotatable base 150. Upon extension of the linear actuator 300, the carrier link 200 moves clockwise (as viewed in FIGS. 5 and 6) to move the user's knee joint from an extended position to a flexed position.

Referring to FIGS. 5 and 6, a user-engagement assembly, shown in the form of a body carrier 1400 for engaging a knee of a user, may include a pivoting frame portion 1402 removably attachable to the carrier link 200. The pivoting frame portion 1402 engages the carrier link 200 telescopically and is secured thereto by a knob 30. The pivoting frame portion 1402 includes a movable and securable base link in the form of a sliding collar 1404, the sliding collar 1404 being slidable along a support rail 1403, which may be generally U-shaped and may have two offset, parallel portions so that a distal platform 1440 may be offset outwardly from the linear actuator 300 and may be removably engaged and secured with respect to the hinge-mount portion 154 of the base link 160 at a selected longitudinal position with respect to the hinge-mount portion 154. The collar 1404 is securable along a length of the support rail 1403 to accommodate the user and a selected configuration. The distal platform 1440 extends transversely from the sliding collar 1404 and may be supported on the sliding collar 1404 by being secured to and extending from a movably securable base plate 1408. A fixed-frame portion 1450 may comprise a proximal platform 1460 attached to the fixed-mount portion 156 of the rotatable base 150. The proximal platform 1460 may be supported by a support rail 1462, which may be generally U-shaped and may have two offset, parallel portions so that the proximal platform 460 may be offset outwardly from the linear actuator 300 and may be removably engaged and secured with respect to the fixed-mount portion 156 of the base link 160 at a selected longitudinal position with respect to the fixed-mount portion 156. The proximal platform 1460 and/or the support rail 1462 may not be needed for any or all movement or loading of a leg or knee of a user and may be removed if not needed. A foot pad 1401 (FIG. 7) may optionally be used to engage the bottom of a foot of a user while addressing a leg, knee, hip, or ankle of the user. The support rail 1403 may be removed from the hinge-mount portion 154, rotated about a lengthwise axis thereof, and re-installed in the hinge-mount portion 154 to allow the distal platform 1440 to be oriented away from the support post 102 and toward the user when reconfiguring between the first mounting configuration of the rotatable base 150 and the second mounting configuration of the rotatable base 150 (discussed above). The support rail 1462 may be removed from the fixed-mount portion 156, rotated about a lengthwise axis thereof, and re-installed in the fixed-mount portion 156 to allow the proximal platform 1460 to be oriented away from the support post 102 and toward the user when reconfiguring between the first mounting configuration of the rotatable base 150 and the second mounting configuration of the rotatable base 150 (discussed above). To address the knee of the user, the knee may be aligned with the main axis A, and the upper leg of the user may be secured by straps or another device to the proximal platform 1460. The lower leg of the user may be secured by straps or another device to the distal platform 1440. The linear actuator 300 may then be operated via the controller 1000 to impose desired loading or movement upon the knee.

Referring to FIGS. 1 and 2, a proximal platform 460 may be attached to the rotatable base 150 but is not required for movement or loading of the elbow joint of the user. Further, the proximal platform 460 may inhibit alignment of the main axis A of the geared hinge with a shoulder of the user. As a result, it may be preferable for certain movements to remove the proximal platform 460 and/or the support rail 462 and use the multiple-joint therapy machine 10 without the proximal platform 460, as shown in FIGS. 3 and 4.

Referring to FIGS. 14-27, a further embodiment of a multiple-joint therapy machine 2010 is disclosed. The multiple-joint therapy machine 2010 comprises a support frame 2100. The support frame 2100 may include a base frame 2020, which may be tubular, ground-engaging frame with transversely extending legs 2022 and a central body 2024. Note that the base frame 2020 is compatible with the embodiments of the multiple-joint therapy machine 10 shown in FIGS. 1-13 and discussed above. The base frame 2020 may be attached to a vertical support in the form of a support post 2102. A movable base in the form of a sliding collar 2110 may axially and slidably engage the support post 2102 and may be securable to the support post 2102 at a selectable height by a pin or bolt 2118 or other member passing through a mounting hole of the support post 2102, which may be disposed on a bracket 2114, and by a pin 2120 or bolt through a selected adjustment hole 2112 of several adjustment holes 2112 of the sliding collar 2110.

Figure 23:
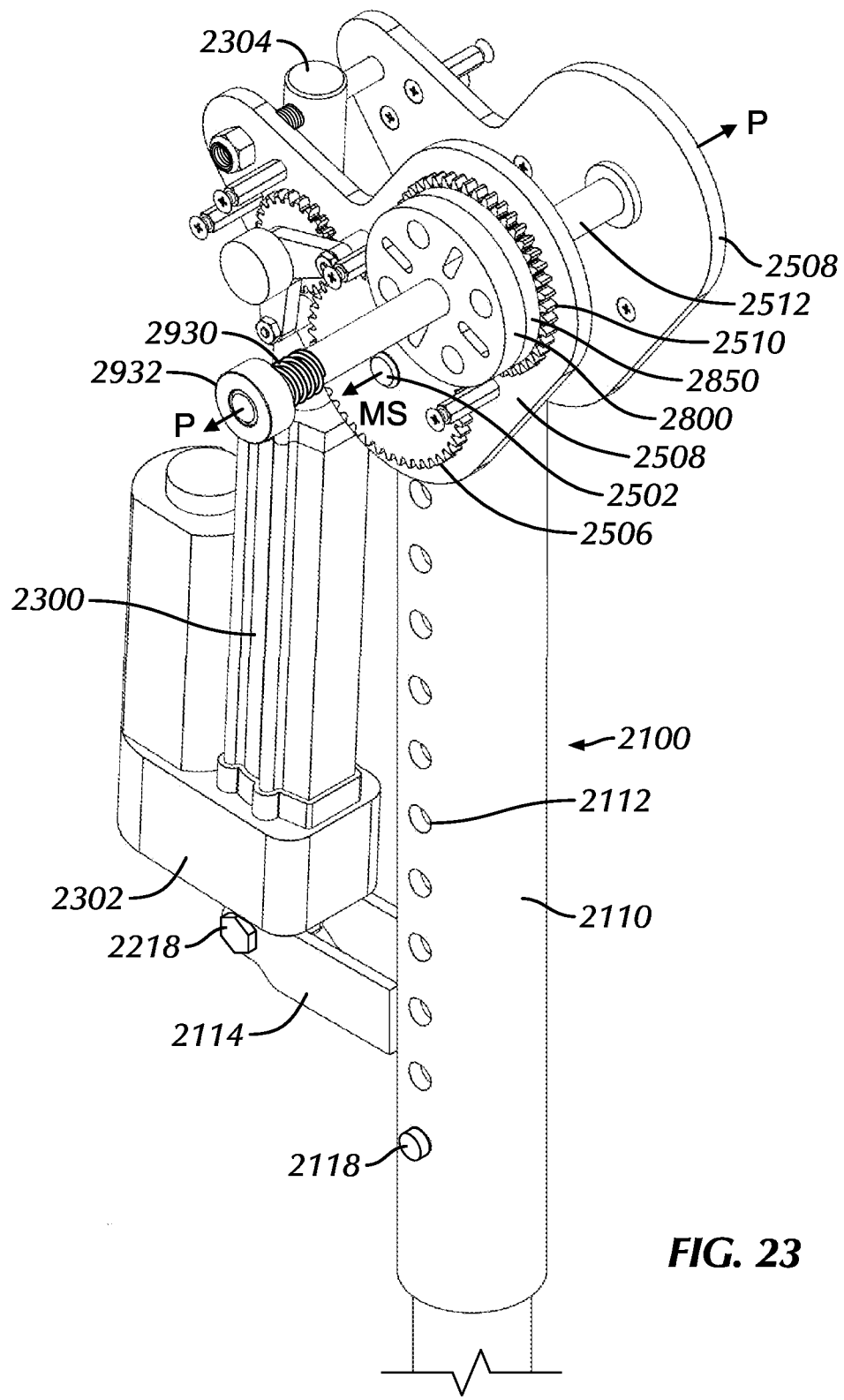
FIG. 23 is a magnified, partial front right perspective view of the multiple-joint therapy machine of FIG. 13, focused on elements of the drive mechanism thereof, with certain elements omitted to show the drive mechanism more clearly.
Figure 24:
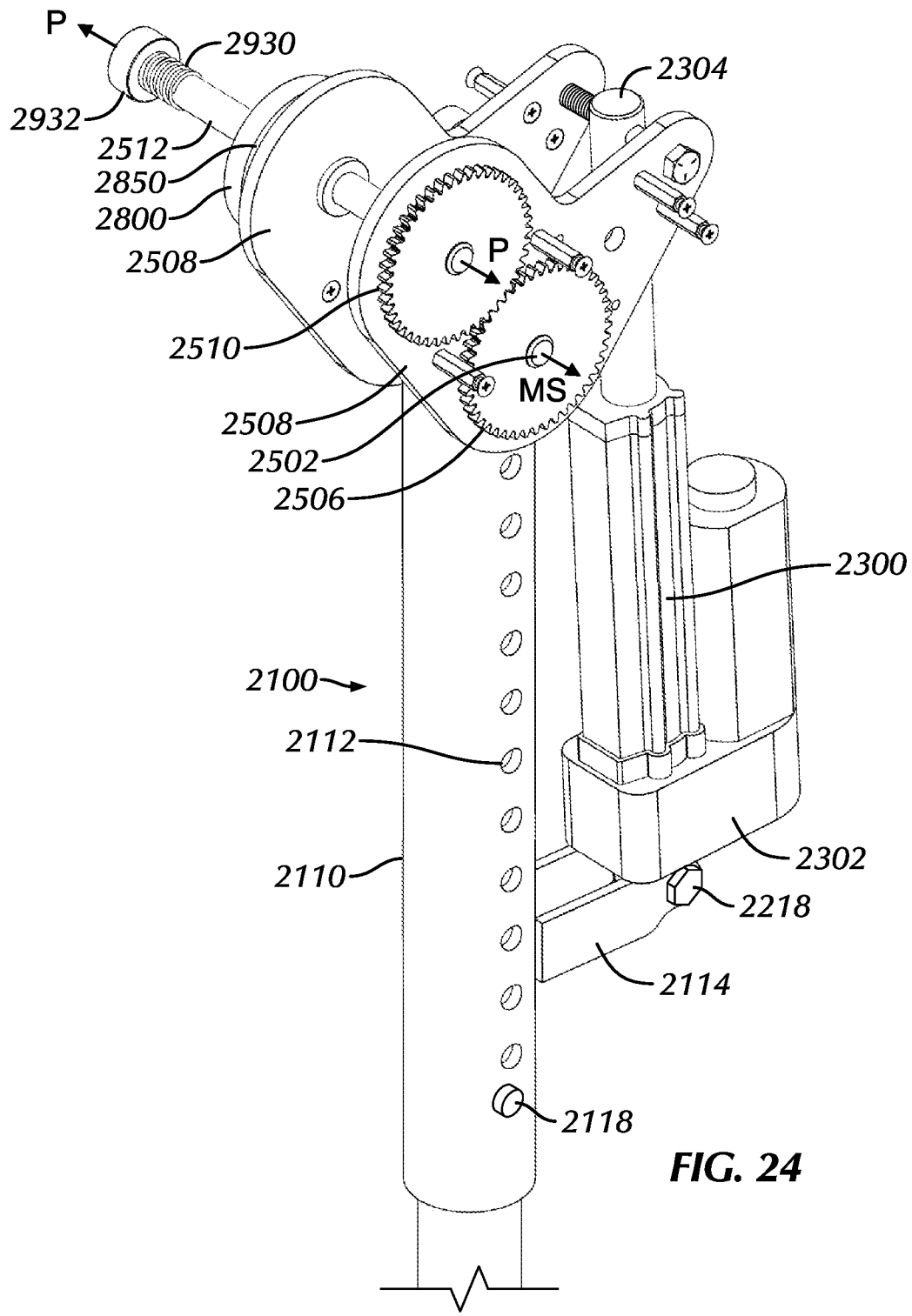
FIG. 24 is a magnified, partial rear right perspective view of the multiple-joint therapy machine of FIG. 13, focused on elements of the drive mechanism thereof, with certain elements omitted to show the drive mechanism more clearly.
Figure 25:
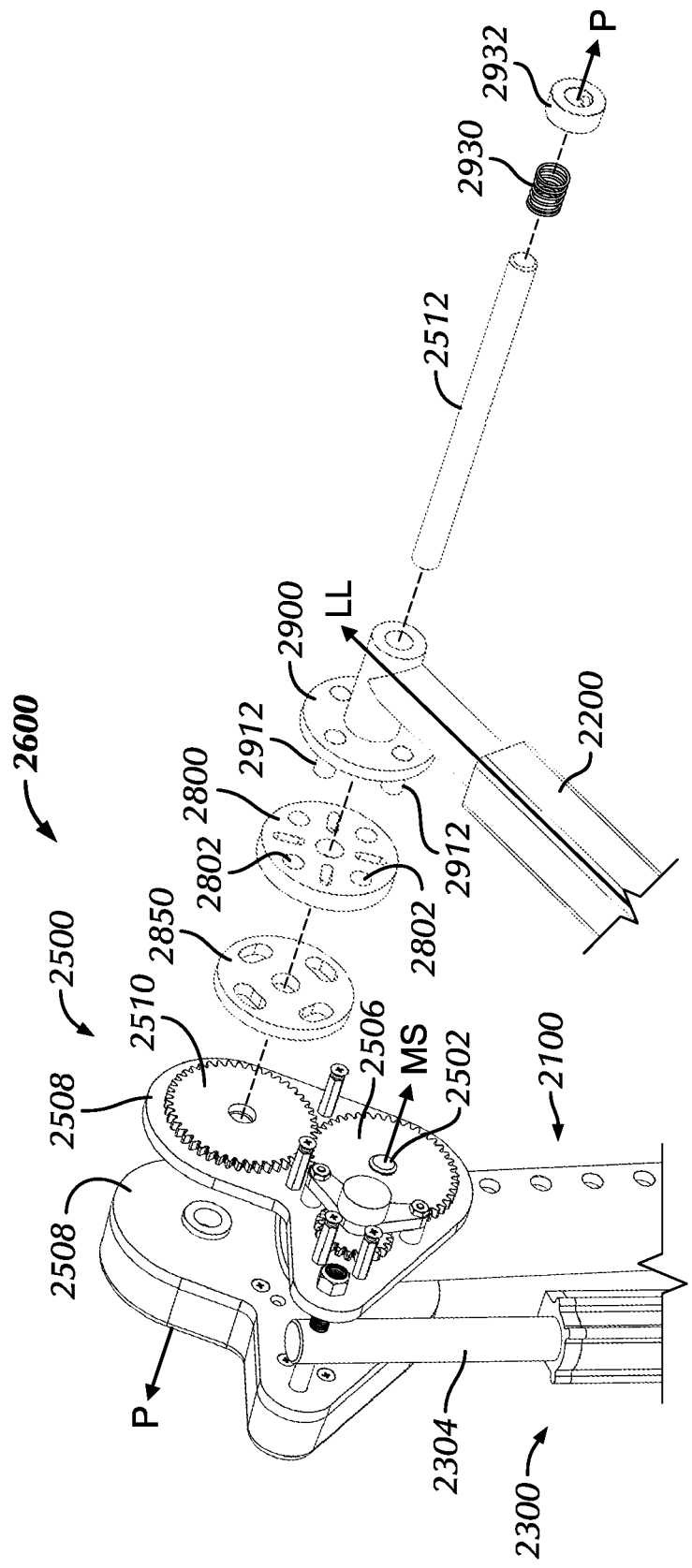
FIG. 25 is a front left perspective, partially exploded view of the multiple-joint therapy machine of FIG. 13, focused on elements of the drive mechanism thereof, with certain elements omitted to show the drive mechanism more clearly.
Figure 26:
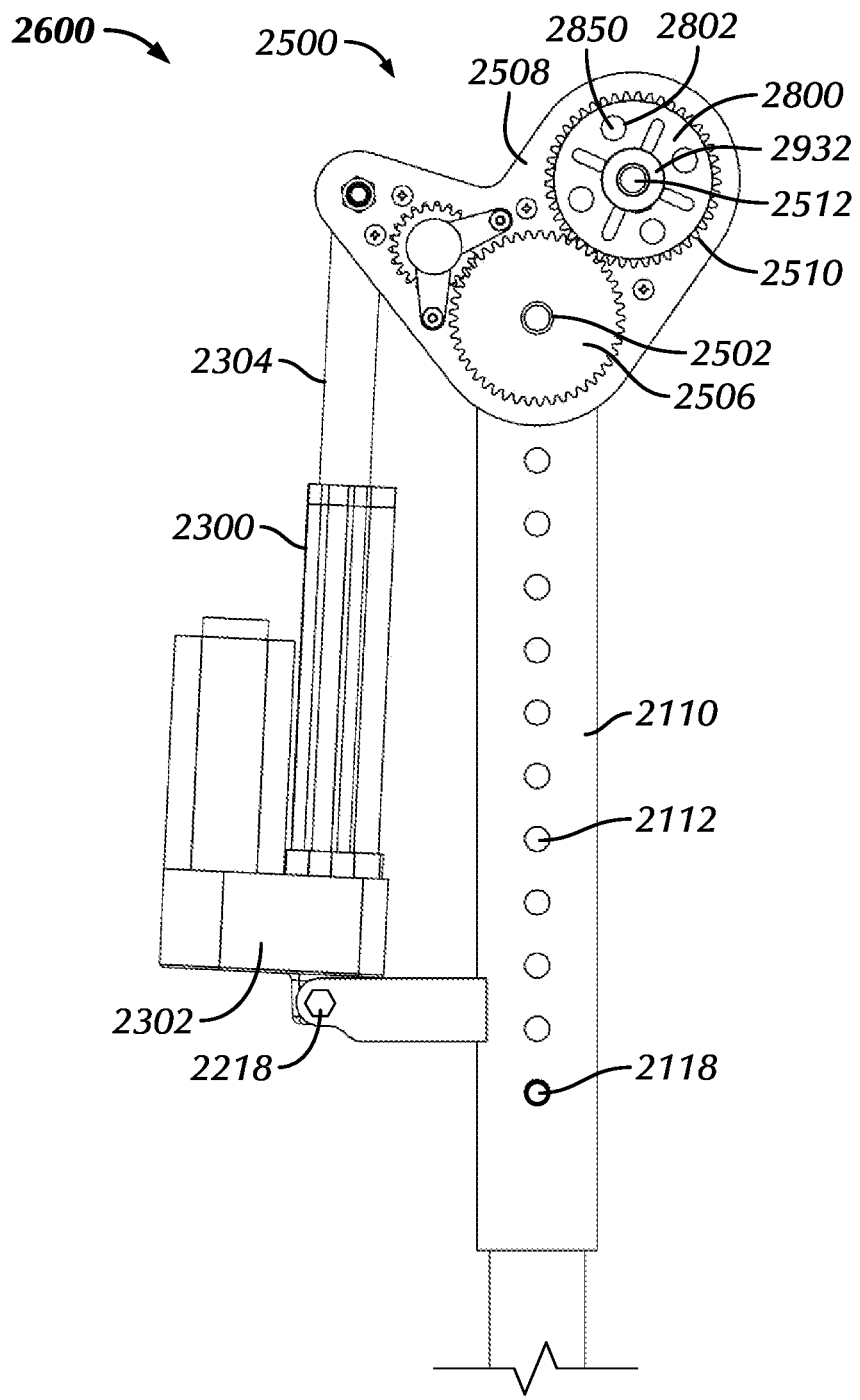
FIG. 26 is a partial front elevational view of the multiple-joint therapy machine of FIG. 13, focused on elements of the drive mechanism thereof, with certain elements omitted to show the drive mechanism more clearly.
Figure 27:
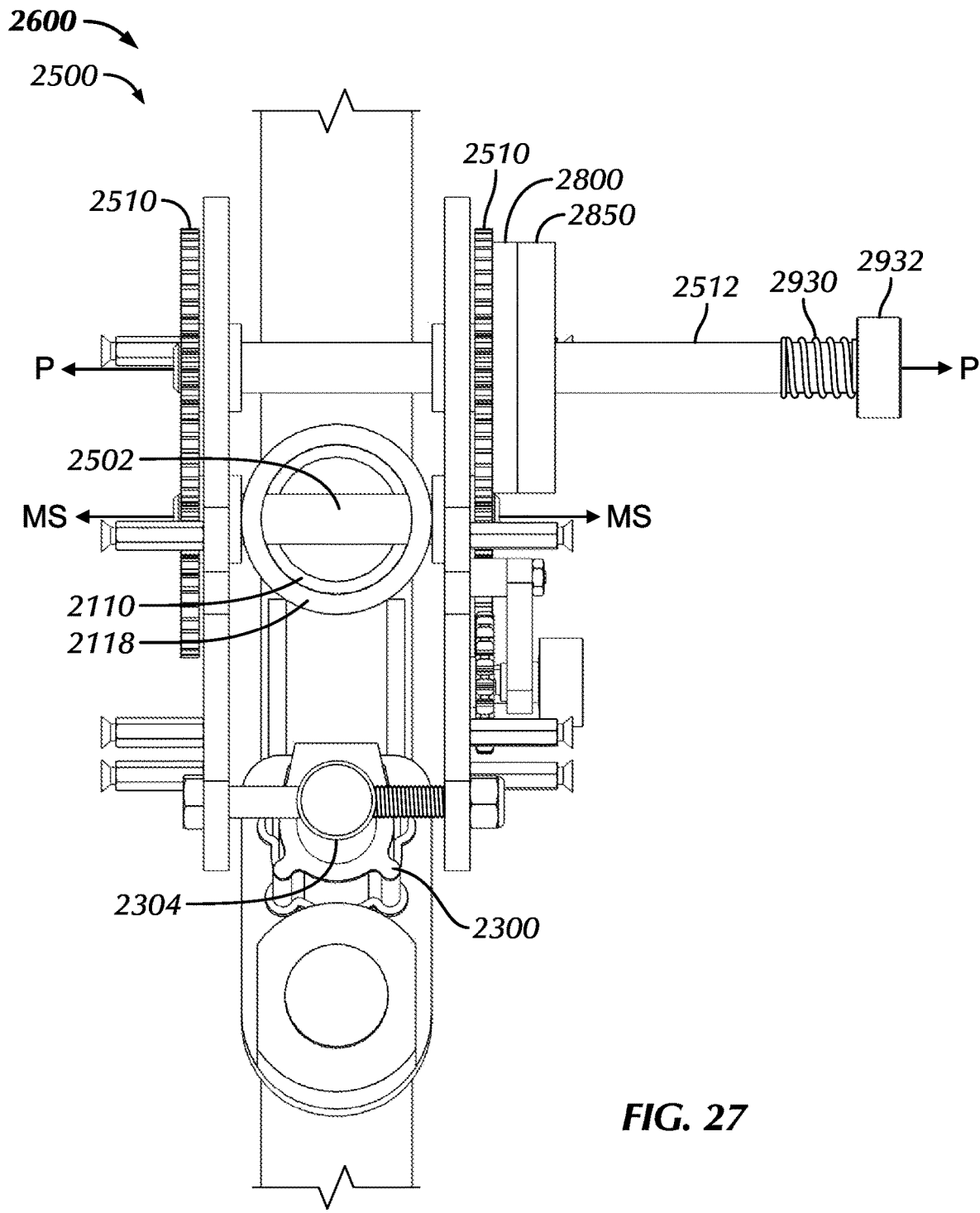
FIG. 27 is a partial top plan view of the multiple-joint therapy machine of FIG. 13, focused on elements of the drive mechanism thereof, with certain elements omitted to show the drive mechanism more clearly.

Continuing to refer to FIGS. 14-27, a planet-gear assembly 2600 may be mounted to the support frame 2100 by being mounted to the sliding collar 2110. As shown in detail in FIGS. 23-26, The planet-gear assembly 2600 may include a geared hinge 2500, which in turn may include a main shaft 2502. The main shaft 2502 may be non-rotatably attached to the support frame 2100 by being non-rotatably attached to the sliding collar 2110. In the illustrated embodiment, the main shaft 2502 may be fixed within a main-shaft mounting hole (two are present in the illustrated embodiment) passing through the sliding collar 2110, in a top end portion thereof. The main shaft 2502 defines a main shaft axis MS (FIGS. 23-25). Attached non-rotatably to the main shaft 2502 is a sun gear 2506 (two are present in the illustrated embodiment). The geared hinge 2500 may include a planet carrier comprising one or two carrier plates 2508, which may be rotatably attached to the main shaft 2502 in parallel and spaced relation to one another to rotate together about the main shaft 2502. The carrier plates 2508 may be joined by screws, pins, bolts or another suitable connection allowing the carrier plates 2508 to rotate together about the main shaft 2502. Together the carrier plates 2508, together with any such connection, may be considered to form a carrier body.

An actuator, which in the illustrated embodiment is a linear actuator 2300, may be operatively connected to drive the carrier plates 2508 making up the planet carrier at least pivotably with respect to the main shaft 2502 about the main shaft axis MS. The actuator 2300 has a first portion 2302 operatively connected with respect to the support frame 2100 by being operatively connected with respect to the sliding collar 2110 via a bracket 2114 and a bolt 2118, a pin, or another suitable connector, which may allow the linear actuator 2300 to pivot where connected to the sliding collar 2110. The actuator 2300 has a second portion 2304 operatively connected to the carrier plates 2508 of the planet carrier.

The carrier plates 2508 may be connected to the distal portion or second portion 2304 of the linear actuator 2300, with a location of connection being offset from the main shaft 2502, so that extension or contraction of the linear actuator 2300 rotates the carrier plates 2508 about a main shaft axis MS of the main shaft 502, which may be a horizontal axis. A planet shaft 2512 may have a planet axis P and may extend between the carrier plates 2508 and may be rotatably mounted with respect to the carrier plates 2508 and the carrier body formed thereby. The sliding collar 2110 may be interposed between the carrier plates 2508 to hold the carrier plates 2508 in spaced relation to one another. Alternatively, the planet shaft 2512 may include a shoulder or other structure to hold the carrier plates 2508 in spaced relation to one another; alternatively, another structural element such as a tubular spacer may be employed to do so. A planet gear 2510 (two are shown) may be non-rotatably mounted with respect to the planet shaft 2512 to rotate together with the planet shaft 2512; and each of the two planet gears 2510 thus may be non-rotatably mounted with respect to the other planet gear 2510, while being rotatably mounted with respect to the carrier plates 2508 and the carrier body formed thereby. Each planet gear 2510 may be engaged with and may mesh with a corresponding one of the sun gears 2506. The sun gear 2506 and the planet gear 2510 are operatively engaged so that when the planet carrier formed by the carrier plates 2508 is driven to rotate with respect to the sun gear 2506, the planet gear 2510 rotates with respect to the sun gear 2506 while revolving about the sun gear 2506. A potentiometer-drive gear 2514 may also be engaged with and may mesh with a corresponding one of the sun gears 2506. The sun gear 2506 and the potentiometer-drive gear 2514 may be operatively engaged so that when the planet carrier formed by the carrier plates 2508 is driven to rotate with respect to the sun gear 2506, the potentiometer-drive gear rotates with respect to the sun gear 2506 while revolving about the sun gear 2506. The potentiometer-drive gear 2514 may be operatively engaged with a potentiometer 2516 so that the potentiometer 2516 may provide an electrical signal indicative of a movement of the potentiometer-drive gear 2514, which signal is indicative of a corresponding movement of the planet gear 2510, the planet carrier formed by the carrier plates 2508, the carrier link 2200, and ultimately the attached body carrier. The potentiometer 2516 may be secured with respect to the carrier plate 2508 by two arms 2518.

A drive hub 2900 may be rotatably supported with respect to the planet shaft 2512. The drive hub 2900 may be configured to be releasably securable at a selectable angular orientation with respect to the planet gear 2510. A carrier link 2200 may be operatively connected to and driven by the drive hub 2900. In the illustrated embodiment, the drive hub has a drive arm 2920 configured for engaging and driving the carrier link 2200. The drive arm 2920 may include a carrier-link fitting 2922 for engaging the carrier link 2200. The carrier link 2200 may engage the drive arm 2920 telescopically by the carrier-link fitting 2922 telescopically engaging the carrier link 2200 (or in other suitable fashion forming a sufficiently strong connection). The carrier link 2200 and drive arm 2920, or the carrier-link fitting 2922 of the drive arm 2920, and may be secured to one another by being formed integrally therewith, by welding, by fasteners, or by a knob (such as knob 30 as disclosed herein) or a pin engaging holes in each component as disclosed herein, or another suitable element. A body carrier 2400 may be mounted on the carrier link 2200. The body carrier 2400 may be adapted to engage a body part of a user, such as an arm or a leg, so that the multiple-joint therapy machine 2010 may be used to impose a load or movement upon a selected joint of a user. Referring to FIGS. 14-17, the body carrier is substantially identical to the pivoting frame portion 402 of the body carrier 400 of FIG. 1, as described above. The body carrier 2400 may include a movable and securable base link in the form of a sliding collar 2404, the sliding collar 2404 being slidable along the carrier link 2200 and securable along a length thereof to accommodate the user and a selected configuration. A transverse link 2406 (FIG. 17) extends transversely from the sliding collar 2404 and has attached thereto a pivoting base 2408, which is pivotable about a vertical axis passing through a mounting bolt 2409 and securable in a selected orientation by a knob 30, which threadedly engages a plate 2431. The pivoting base 2408 in turn supports a pivoting link 2410 extending therefrom. The pivoting link 2410 supports a lower-arm platform 2440 and a hand grip 2420 extending transversely thereto. The pivoting link 2410 may have a hand grip support 2412 attached thereto, with a hand grip 2420 mounted on the hand grip support 2412. The pivoting link 2410, the hand grip 2420, and the lower-arm platform 2440 may be mounted pivotably with respect to the transverse link 2406 to allow the hand grip 2420 (as well as the lower-arm platform 2440) to rotate or pivot.

Figure 18:
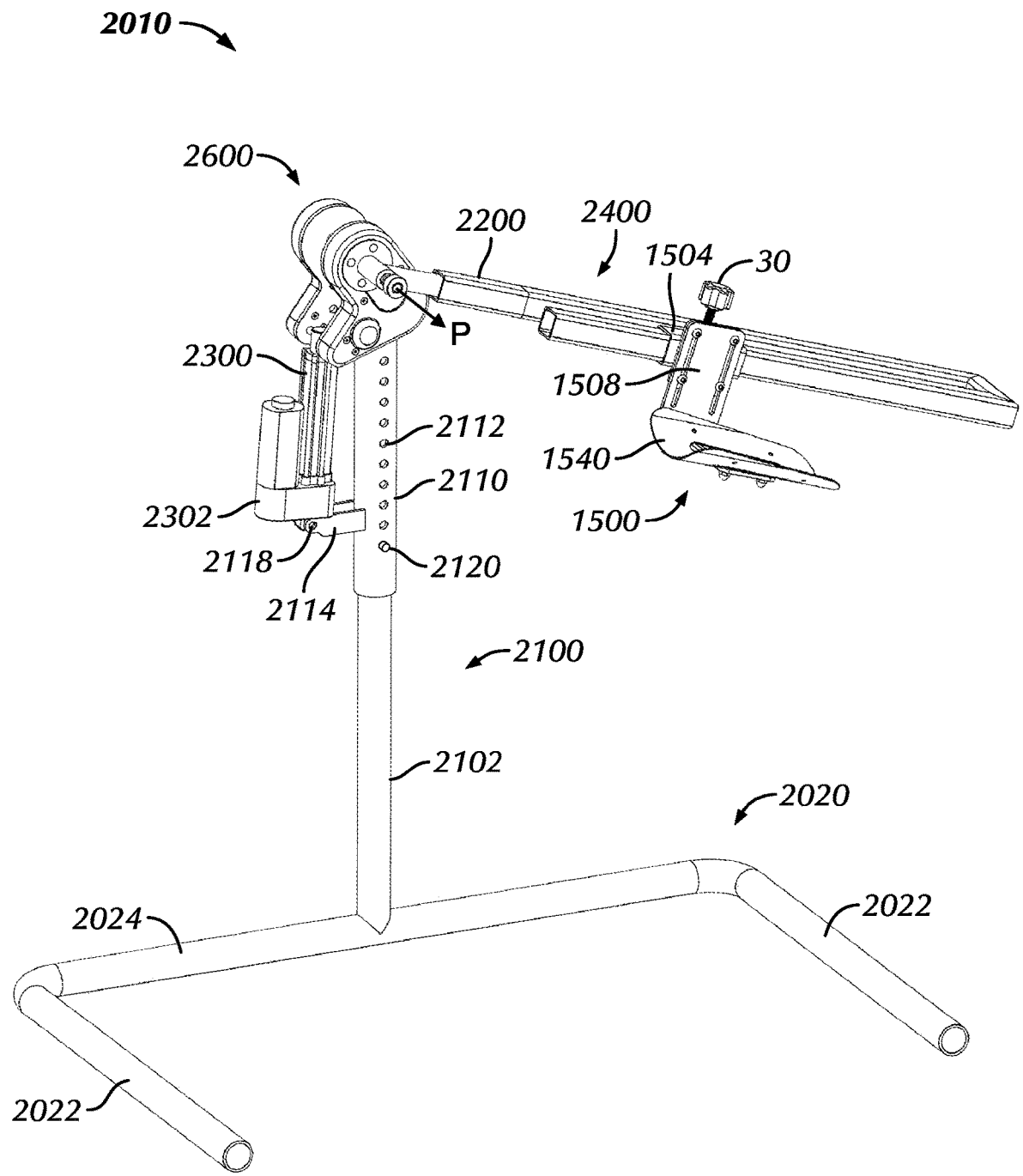
FIG. 18 is a front left perspective view of the multiple-joint therapy machine of FIG. 13 configured to manipulate a left knee of a user, with the various elements thereof in a configuration with the included linear actuator in a retracted configuration.
Figure 19:
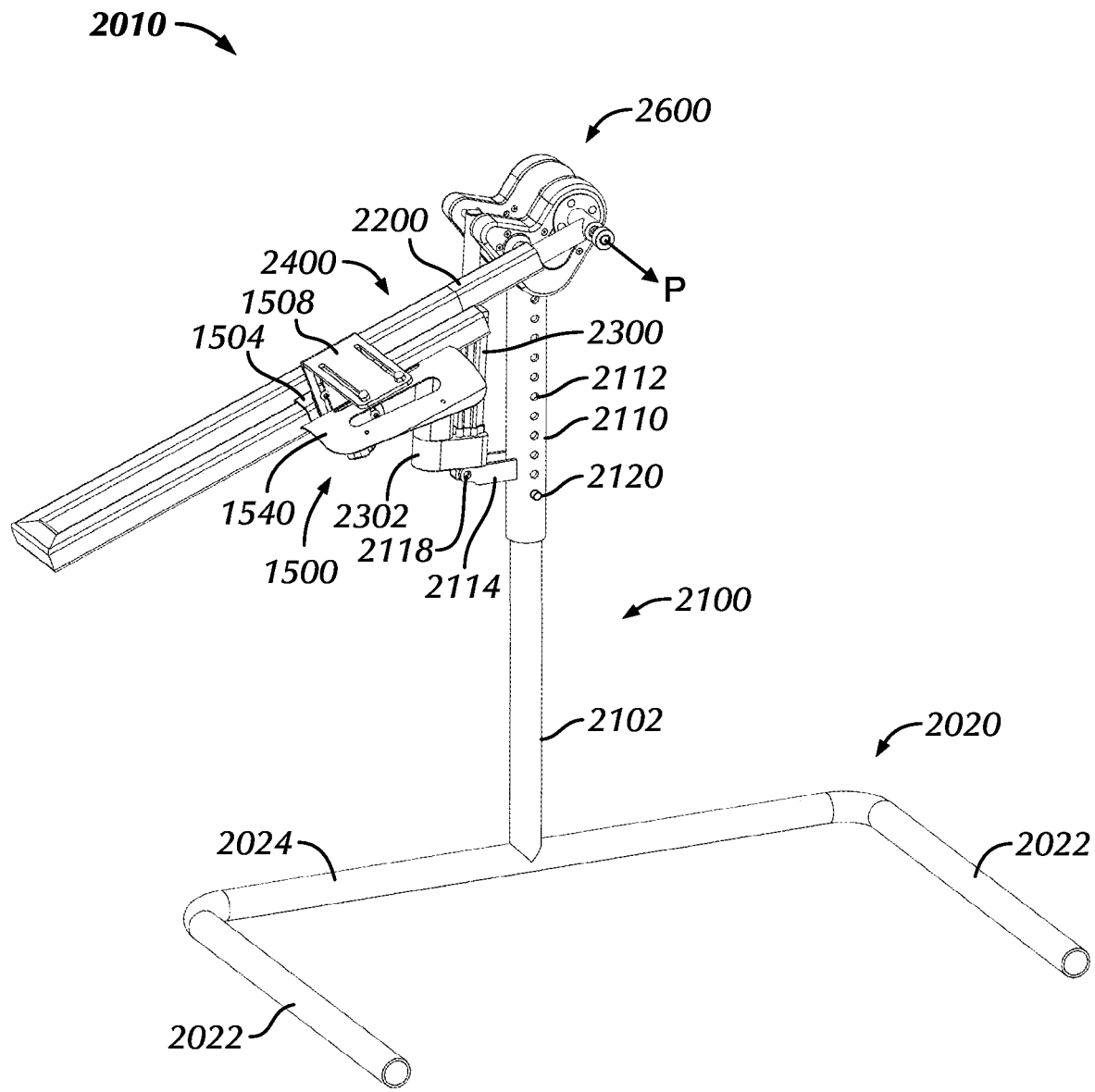
FIG. 19 is a front left perspective view of the multiple-joint therapy machine of FIG. 13 configured to manipulate a left knee of a user, with the various elements thereof in a configuration with the included linear actuator in an extended configuration.

FIGS. 18 and 19 show an alternative carrier link 2201, which has a U-shaped form with two longitudinal sections 2203 joined by a transverse section 2205. Attached to the alternative carrier link is a carrier body 1500, which includes a movable and securable base link in the form of a sliding collar 1504, the sliding collar 1504 being slidable along the longitudinal section 2203. The collar 1404 is to accommodate the user and a selected configuration. A platform 1540 extends transversely from the sliding collar 1404 and may be supported on the sliding collar 1504 by being secured to and extending from a movably securable base plate 1508.

Figure 20:
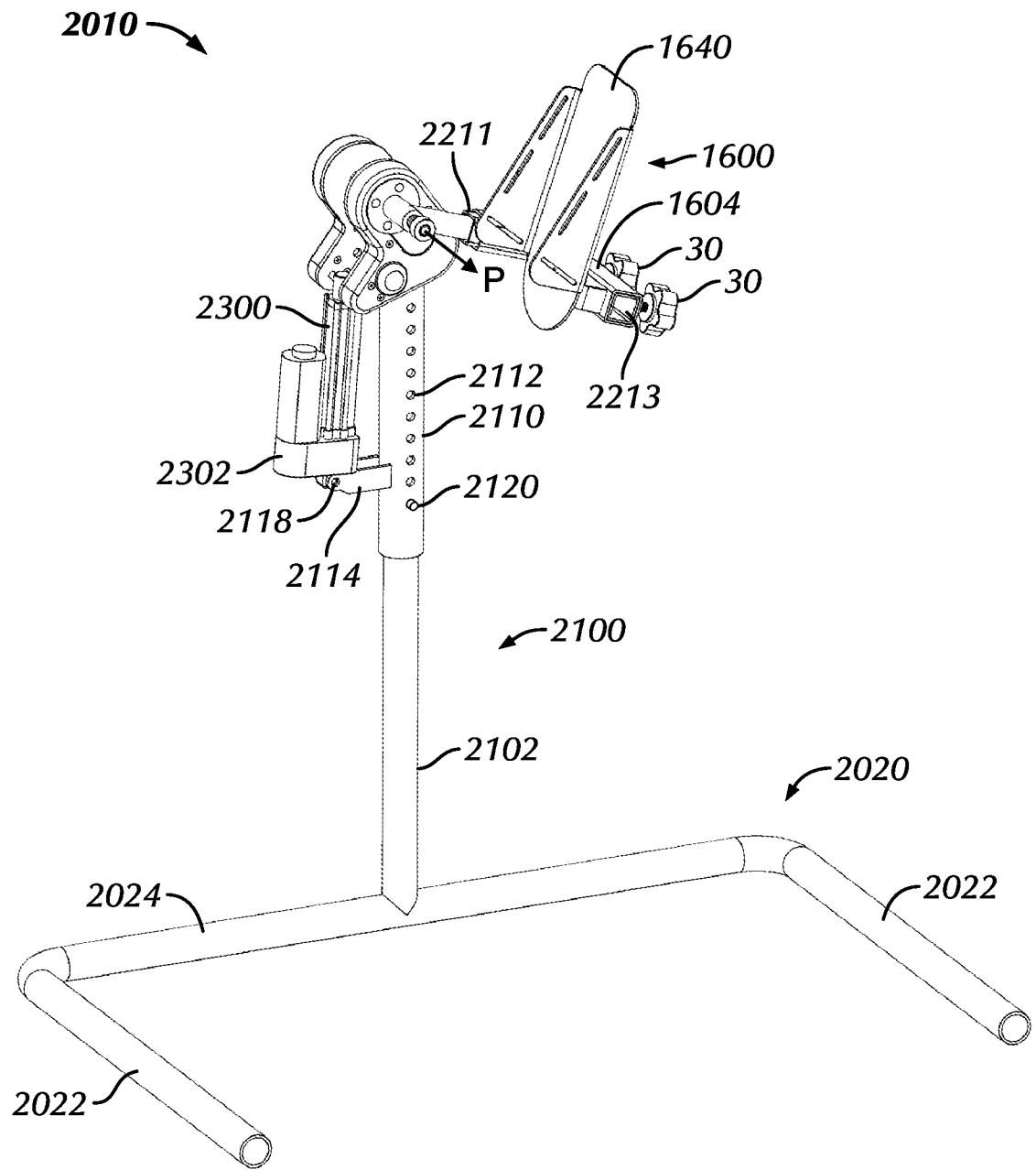
FIG. 20 is a front left perspective view of the multiple-joint therapy machine of FIG. 13 configured to manipulate a left ankle of a user, with the various elements thereof in a configuration with the included linear actuator in an extended configuration.
Figure 21:
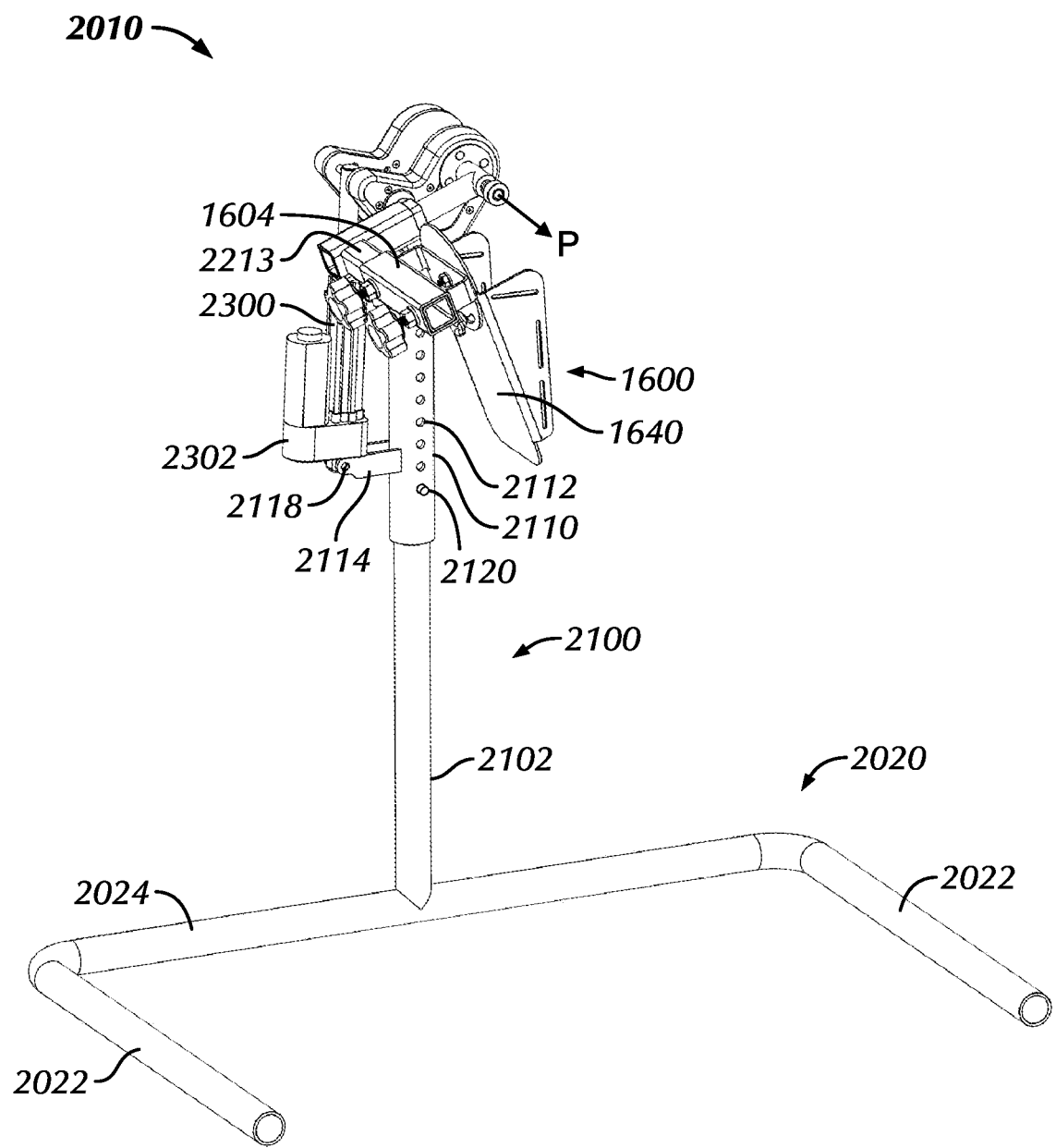
FIG. 21 is front left perspective view of the multiple-joint therapy machine of FIG. 13 configured to manipulate a left ankle of a user, with the various elements thereof in a configuration with the included linear actuator in a retracted configuration.
Figure 22:
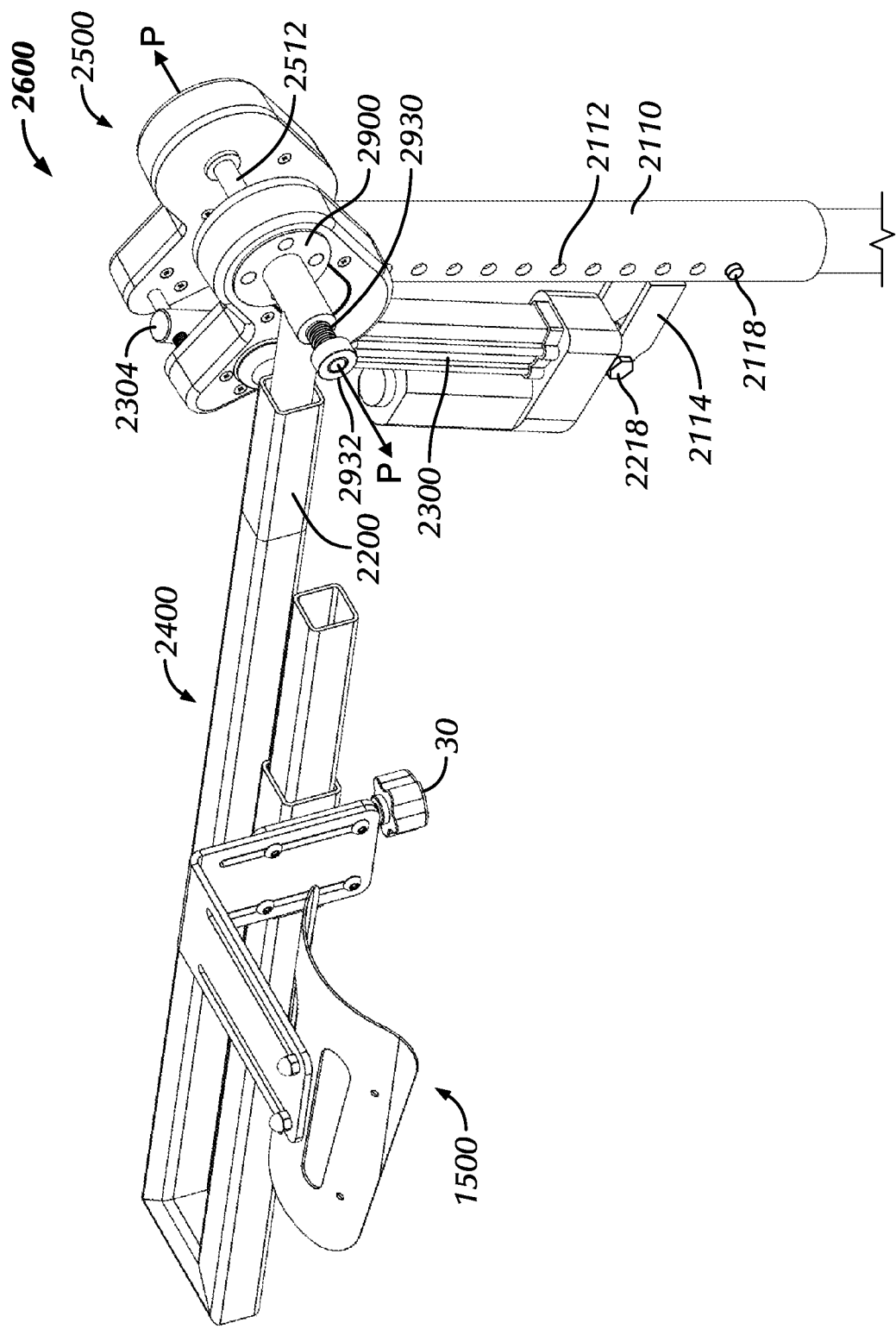
FIG. 22 is a magnified, partial front right perspective view of the multiple-joint therapy machine of FIG. 13, the multiple-joint therapy machine being configured to manipulate a left knee of a user, with the various elements thereof in a configuration with the included linear actuator in an extended configuration, focused on elements of the drive mechanism thereof, with certain elements omitted to show the drive mechanism more clearly.

FIGS. 20 and 21 show another alternative carrier link 2211, which is relatively short and includes a transverse section 2213 (FIG. 21). Attached to the alternative carrier link is a body carrier 1600, which includes a movable and securable base link in the form of a collar 1604. The collar 1604 is to accommodate the user and a selected configuration. A platform 1640 extends transversely from the sliding collar 1604 and may be supported on the collar 1604 by being secured to and extending from a movably securable base plate 1608.

Referring to FIGS. 23-27, an intermediate hub 2800 may be non-rotatably attached with respect to the planet shaft 2512, and the drive hub 2900 may be configured to be releasably securable at a selectable angular orientation with respect to the intermediate hub 2800 and thereby to be releasably securable at a selectable angular orientation with respect to the planet gear 2510. The drive hub 2900 may be non-rotatably attached to the planet gear 2510 by welding, adhesive, fasteners, or another suitable element.

Continuing to refer to FIGS. 23-27, in the illustrated embodiment, the intermediate hub 2800 has four hub apertures 2802. The drive hub 2900 comprises a planet disc 2910, the planet disc 2910 having an axially oriented extension extending toward the intermediate hub 2800. In the illustrated embodiment, four axially oriented extensions are provided in the form of four pins 2912, the planet disc 2910 having a radial arm in the form of a drive arm 2920 attached thereto and adapted to engage the carrier link 2200 to rotate about the planet axis P, may be a central longitudinal axis of the planet shaft 2512. Referring to FIGS. 14-21, a selected body carrier 2400, 1500, 1600 is in turn secured to the drive hub 2900 via the carrier link 2200; body carriers 400, 400', 1400 disclosed above with respect to the multiple-joint therapy machine 10 may also be attached to and used with the multiple-joint therapy machine 2010. Any selected body carrier may be attached to the drive hub 2900 by being mounted on and attached in suitable fashion (welding, fasteners, preferably a knob 30 as disclosed herein, in combination with suitable apertures, a pin, or the like) to a drive arm 2920 of the drive hub 2900.

Figure 14:
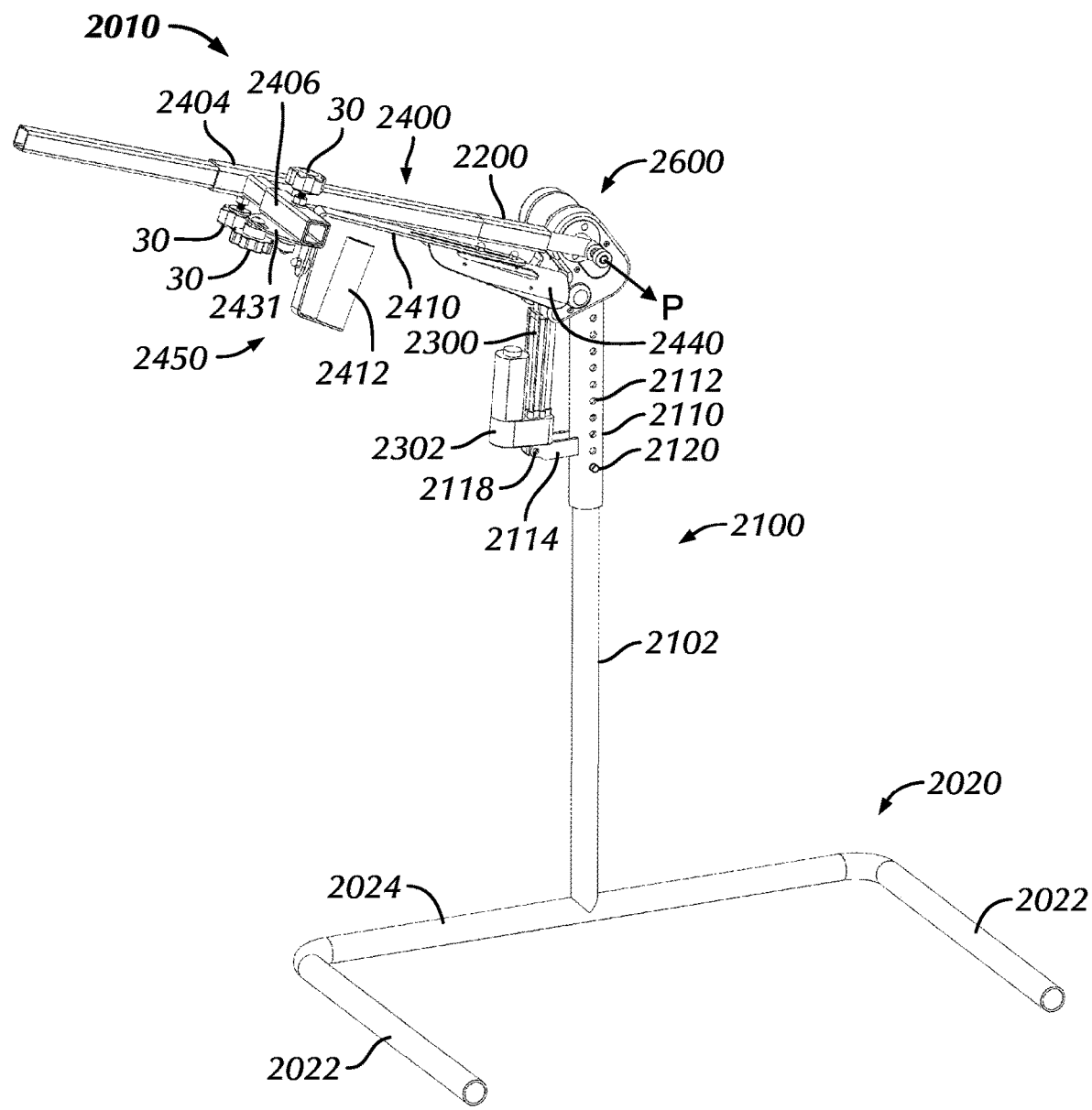
FIG. 14 is a front left perspective view of a multiple-joint therapy machine according to a second embodiment of the present disclosure, configured to manipulate a left shoulder of a user, with the various elements thereof in a configuration with an included linear actuator in a retracted configuration, set for movement through a first range of motion.
Figure 15:
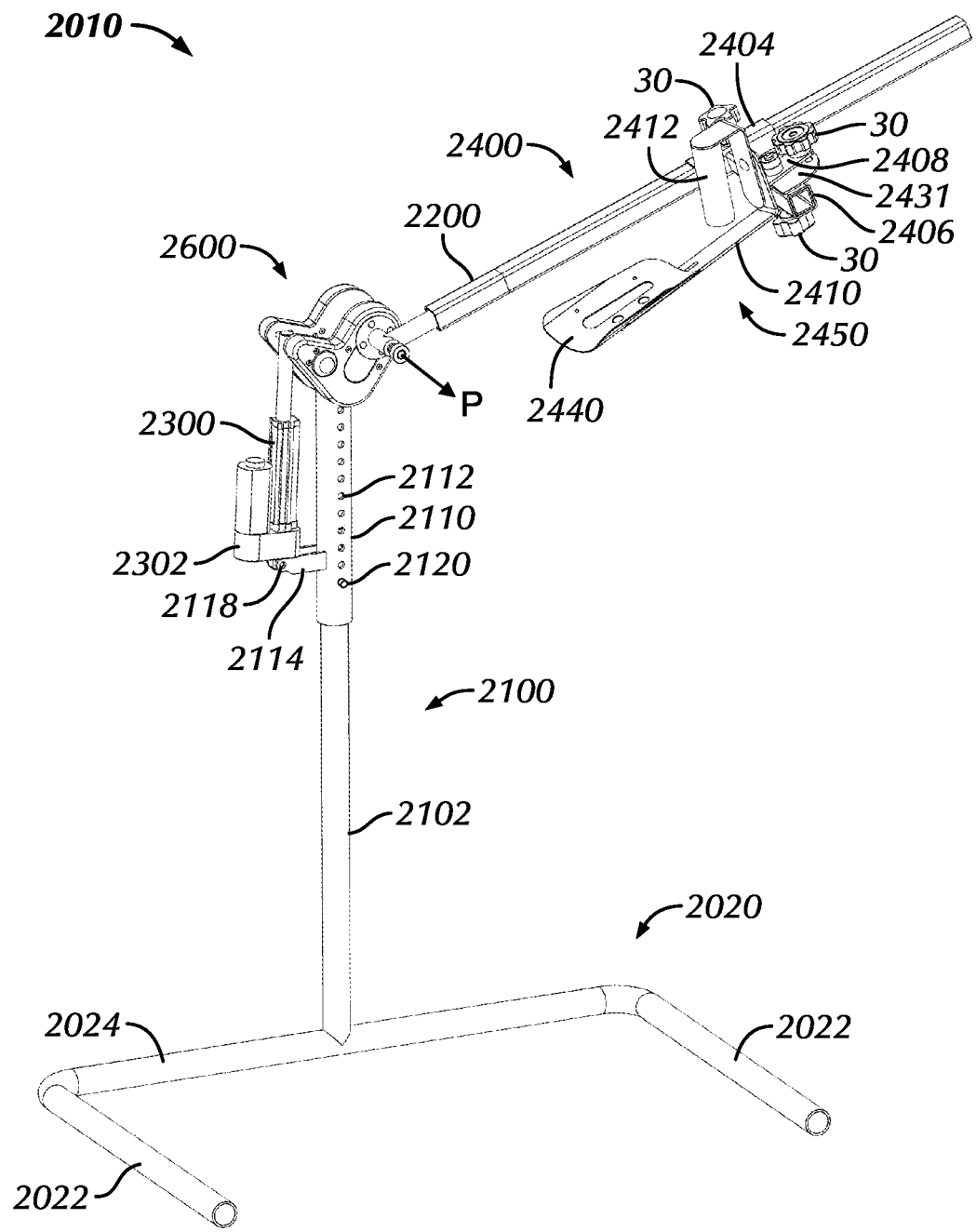
FIG. 15 is a front left perspective view of the multiple-joint therapy machine of FIG. 13, configured to manipulate a left shoulder of a user, with the various elements thereof in a configuration with the included linear actuator in an extended configuration, set for movement through a first range of motion.
Figure 16:
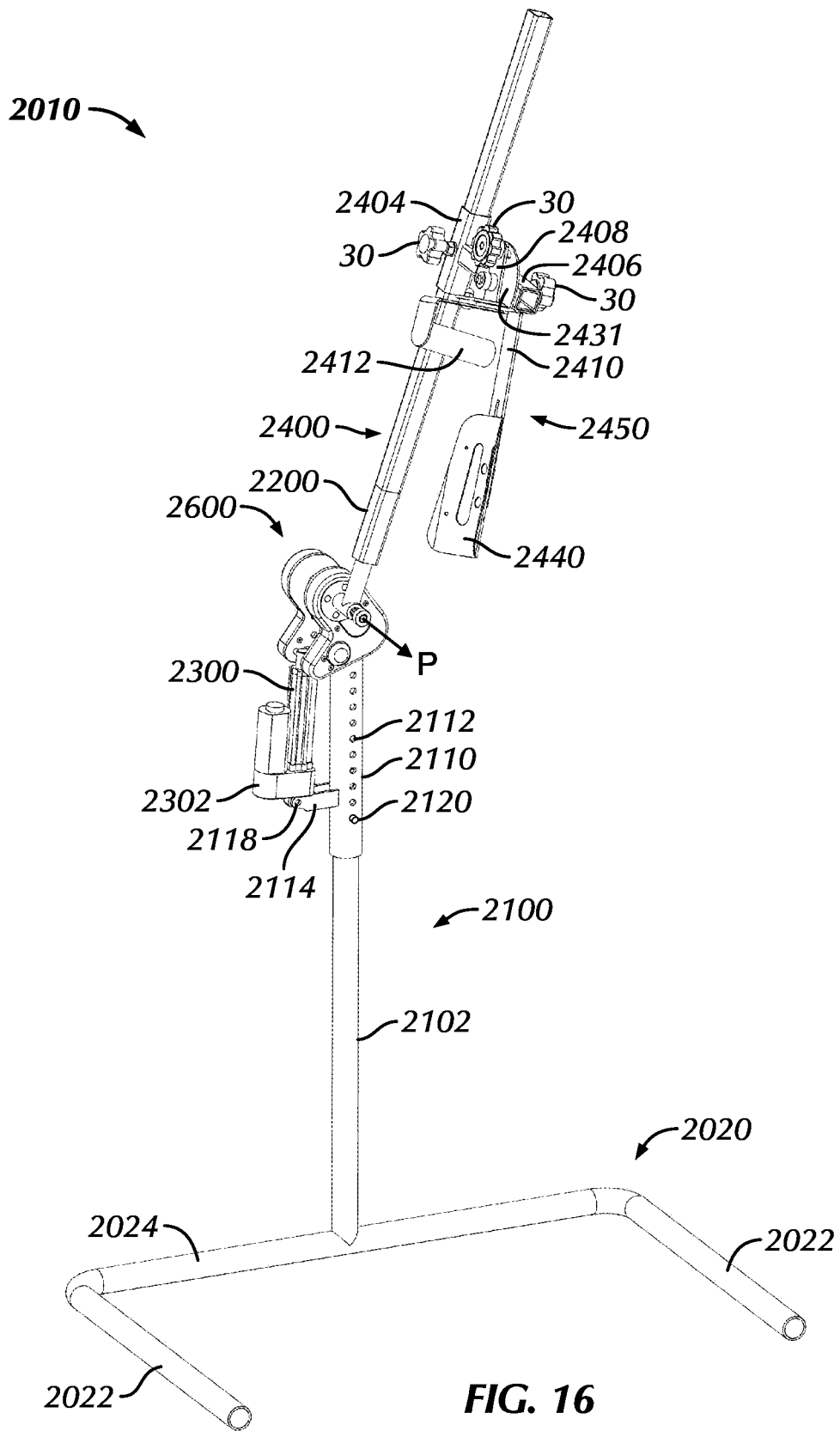
FIG. 16 is a front left perspective view of the multiple-joint therapy machine of FIG. 13 configured to manipulate a left elbow or shoulder of a user, with the various elements thereof in a configuration with the included linear actuator in a retracted configuration, set for movement through a second range of motion.
Figure 17:
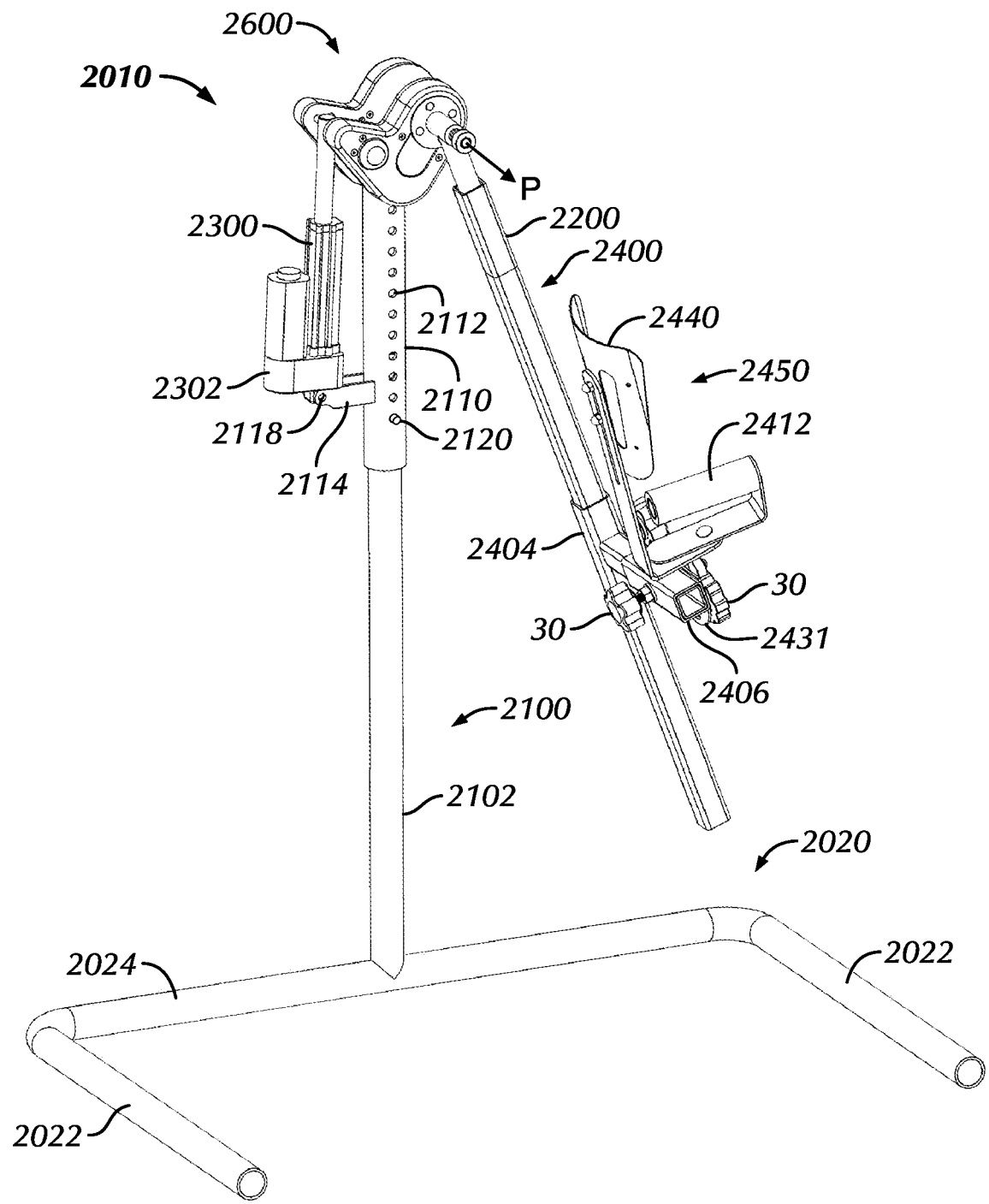
FIG. 17 is a front left perspective view of the multiple-joint therapy machine of FIG. 13 configured to manipulate a left elbow or shoulder of a user, with the various elements thereof in a configuration with the included linear actuator in an extended configuration, set for movement through a second range of motion.

The drive hub 2900 may be slidably mounted on the planet shaft 2512 and may be biased axially by a spring 2930 disposed between the drive hub 2900 and a nut 2932 disposed on the planet shaft 2512. The drive hub 2900 may be biased toward the intermediate hub 2800 to engage each pin 2912 (extension) with a selectable one of the four hub apertures 2802. The drive hub 2900 may be configured to slide axially away from the intermediate hub 2800 so that the pins 2912 disengage from the hub apertures 2802. When the pins 2912 are disengaged from the hub apertures 2802, the drive hub 2900 may be rotated with respect to the intermediate hub 2800. The drive hub 2900 may be biased to re-engage the pins 2912 with the hub apertures 2802 when the pins 2912 are aligned with the hub apertures 2802. As a result, a selected one of the pins 2912 may be released from a first selected one of the hub apertures 2802 and then engaged with a second selected one of the hub apertures to secure the drive hub 2900 to rotate with the intermediate hub 2800 (and thus with the planet shaft 2512 and attached planet gears 2510), with starting and ending orientations of the carrier link 2200 selected by disengaging and then reengaging the pins 2912 in the hub apertures 2802 when the desired orientation is reached. This arrangement is advantageous in part because the planet-gear assembly 2600, including the geared hinge 2500 and the linear actuator 2300, typically provides a range of motion less than 180 degrees, and typically about 140 degrees. Because the drive hub 2900 may be secured at different angular orientations with respect to the planet gears 2510, the range of motion of the planet-gear assembly 2600, and the resulting range of motion of the carrier link 2200 and any body carrier attached thereto, may be selected to align with a desired range of motion. For example, FIGS. 14 and 15 show a range of motion encompassing about 140 degrees of motion, with the carrier link moving from about 80 degrees counterclockwise from vertical to about 60 degrees clockwise from vertical. This range of motion is suitable for an overhead movement of the user's arm to exercise the user's shoulder. For a further example, FIGS. 16 and 17 show a range of motion encompassing about 140 degrees of motion, with the carrier link moving from about 20 degrees clockwise from vertical on one end of the range of motion, to about 160 degrees clockwise from vertical. This range of motion is suitable for a movement of the user's arm to exercise the shoulder in flexion and extension, from an overhead position in FIG. 16 to a lowered position in FIG. 17. For a further example, FIGS. 18 and 19 show a range of motion encompassing about 140 degrees of motion, with the carrier link moving from about 20 degrees clockwise from horizontal at one end of the range of motion, to about 160 degrees clockwise from horizontal. This range of motion is suitable for a movement of the user's lower leg to exercise the knee in extension and flexion, from an extended position in FIG. 18 to a flexed position in FIG. 19. For a further example, FIGS. 20 and 21 show a range of motion encompassing about 140 degrees of motion, with the carrier link moving from about 20 degrees clockwise from horizontal to about 160 degrees clockwise from horizontal. This range of motion is suitable for a movement of the user's foot lower leg to exercise the ankle in extension and flexion, from a flexed position in FIG. 20 to an extended position in FIG. 21. Note that in many cases the range of motion of the multiple-joint therapy machine 2010 in a given configuration may exceed the range of motion that is desirable or possible for a particular user or joint. As discussed below, the controller 1000, acting under manual or programmed operation, may limit the range of motion imposed on the user's joint during a particular exercise, by limiting the motion of the multiple-joint therapy machine, manually or by programming.

The geared hinge 2500 may further comprise an elastic disc 2850 disposed on the planet shaft 2512 adjacent the intermediate hub 2800. In the illustrated embodiment, the elastic disc 2850 is disposed on the planet shaft 2512 between intermediate hub 2800 and the drive hub 2900. The elastic disc 2850 includes disc apertures 2852, which allow the pins 2912 to pass through the elastic disc 2850 to engage the intermediate hub 2800.

Figure 28:
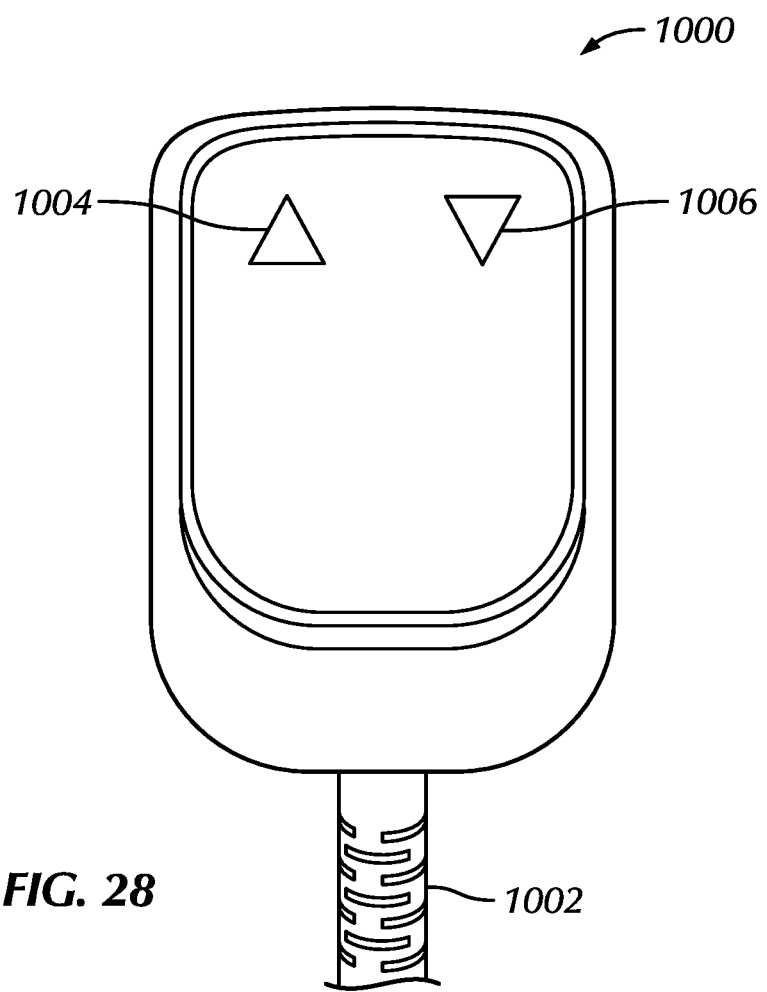
FIG. 28 is a view of a controller compatible with any embodiment of a multiple-joint therapy machine disclosed herein.

Referring to FIG. 28, a controller 1000 for use with the multiple-joint therapy machine 10, 2010 may be operatively connected, wirelessly or, for example, by a cord 1002, to the linear actuator 300, 2300. The controller 1000 may receive input from one or more position sensors associated with the linear actuator 300, 2300 and may process the inputs to control movement of the multiple-joint therapy machine 10, 2010 by controlling movement of the linear actuator 300, 2300, or may provide manual control of the linear actuator 300, 2300. Despite the versatility of the multiple-joint therapy machine 10, 2010 manual control of the multiple-joint therapy machine 10, 2010 in use may be configured for simplicity by requiring only one actuator, the linear actuator 300, 2300, which may be controlled either to extend or to retract, with a resulting movement of the multiple-joint therapy machine 10, 2010. The controller 1000 may comprise a hand-held box with switches such as membrane switches 1004, 1006 for initiating movements of the linear actuator 300, 2300. As few as two membrane switches may be used; additional switches may be used to initiate movements of the linear actuator, with the additional switches having graphical representations of various configurations of the multiple-joint therapy machine 10, 2010. Because the linear actuator 300, 2300 has only two movements, multiple membranes may be serviced by a single switch. The controller 1000 may be held and actuated by the user or by an operator (not shown). Actuation by the user may be particularly advantageous, as the user may be able to halt uncomfortable or painful movements immediately. Thus the controller 1000 may be a simple switch configured to provide power to selectively extend or retract or otherwise operate the linear actuator 300; or the controller 1000 may encompass a microprocessor, micro controller, or other device capable of executing instructions or programs and thereby extending, retracting, or otherwise operating the linear actuator 300, 2300 in a programmed manner. The controller 1000 may receive and process information about motion of the device from the potentiometer 2516.

A method of using the multiple-joint therapy machine 10, 2010 to impose loading or movement on a shoulder, arm, knee, or other joint of a user may include any or all of the following steps employing any of the embodiments disclosed herein, or any combination of elements and configurations disclosed herein. As a step in such a method, an orientation of a chair or table may be adjusted so that a selected one of the arms or legs of the user may be placed on the side of the user's body adjacent to the multiple-joint therapy machine 10, 2010. The multiple-joint therapy machine 10, 2010 may be configured so that the user-engagement assembly, including the body carrier 400, 400', 1400, 2400, 1500, 1600 is oriented toward the chair or table for the user. The height of the user-engagement assembly including the body carrier 400, 400', 1400, 2400, 1500, 1600 may be selected by loosening the knobs 30, sliding the collar 110, 2110 along the support post 102, 2102 and then tightening the knobs 30 to secure the collar 110, 2110 at the desired height. An arm or leg of a user may be secured by straps and/or by gripping, by the hand of the user, the body carrier 400, 400', 1400, 2400, 1500, 1600. The linear actuator 300, 2300 of the multiple-joint therapy machine 10, 2010 may be controlled automatically or manually via the controller 1000 to impose a desired load or movement upon an arm or leg of the user, or upon an elbow, a shoulder, a knee, a hip, or an ankle joint of the user.

Figure 12:
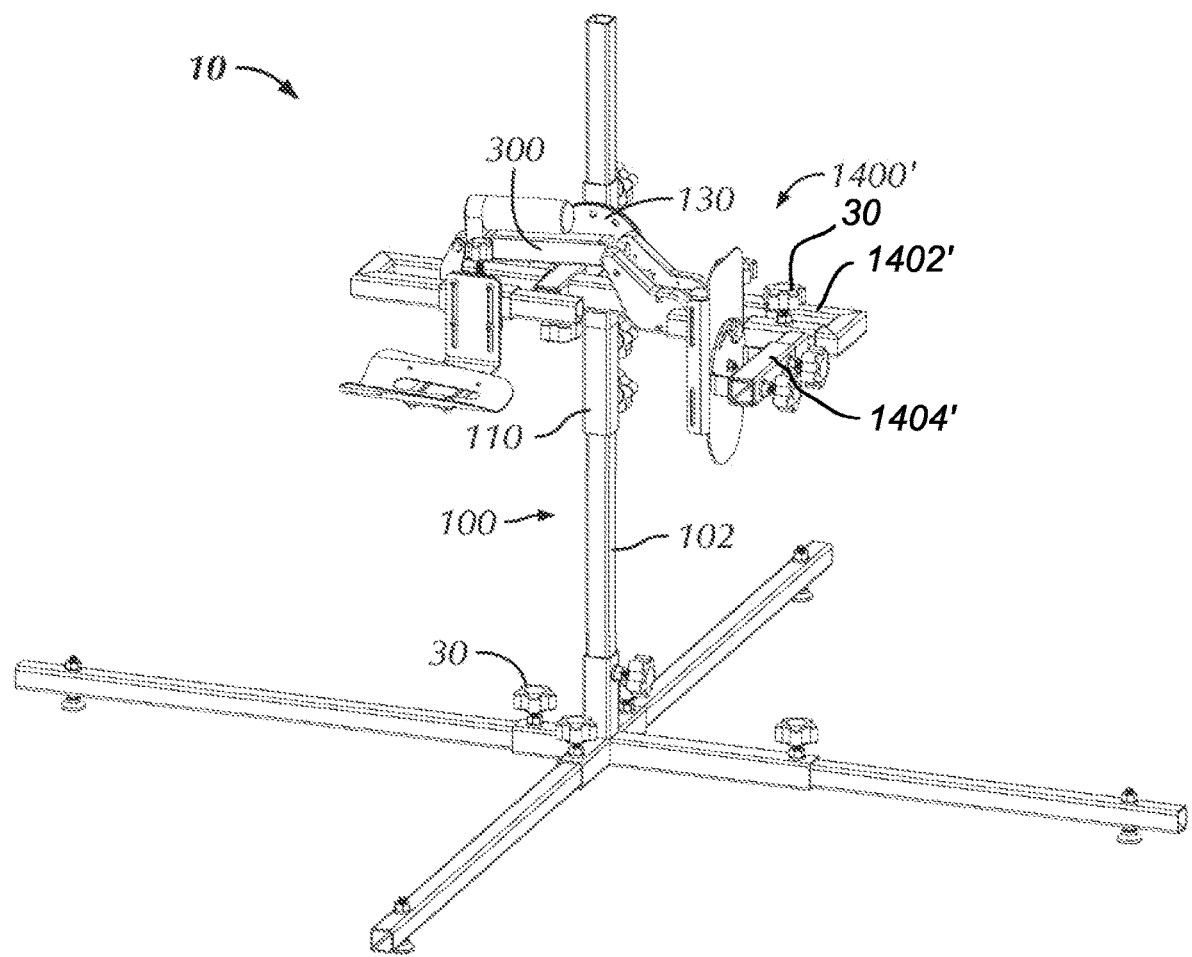
FIG. 12 is a front right perspective view of the multiple-joint therapy machine of FIG. 1 configured to manipulate a left ankle of a user, with the various elements thereof in a configuration with the included linear actuator in a retracted configuration, according to the embodiment of FIG. 1.
Figure 13:
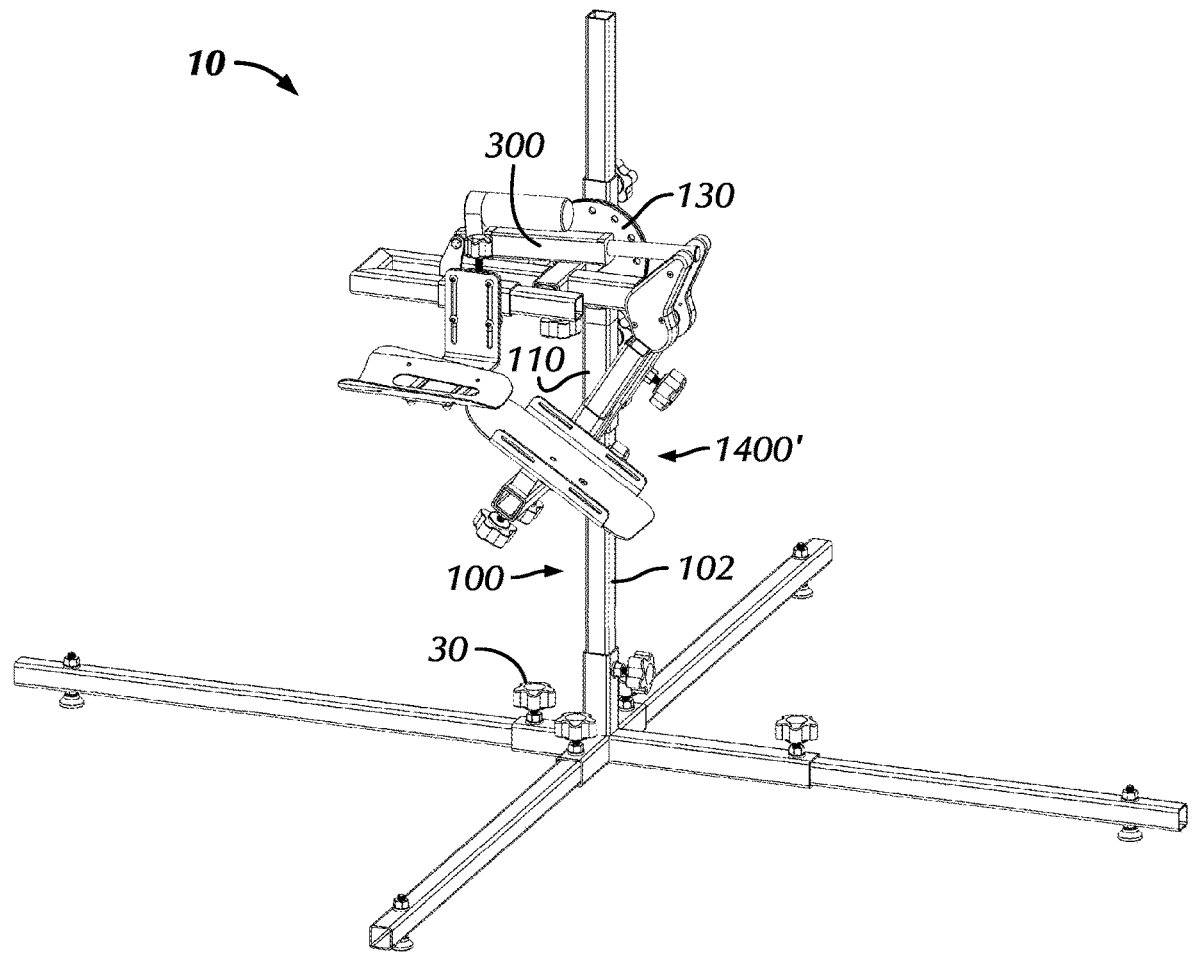
FIG. 13 is a front right perspective view of the multiple-joint therapy machine of FIG. 1 configured to manipulate a left ankle of a user, with the various elements thereof in a configuration with the included linear actuator in an extended configuration, according to the embodiment of FIG. 1.

Referring to FIGS. 12 and 13, the user-engagement assembly 1400' for engaging a knee of a user may include a pivoting frame portion 1402' removably attachable to the carrier link 200. The pivoting frame portion 1402' engages the carrier link 200 telescopically and is secured thereto by a knob 30. The pivoting frame portion 1402' includes a movable and securable base link in the form of a sliding collar 1404', the sliding collar 1404' being slidable along pivoting frame portion 1402', which may be linear or U-shaped. The sliding collar 1404' may be secured with respect to the hinge-mount portion 154 of the base link at a selected longitudinal position with respect to the hinge-mount portion 154. The collar 1404' is securable along a length of the support rail 1403 to accommodate the user and a selected configuration.

The multiple-joint therapy machine 10 may be used to impose movement or a load upon either a left-side joint or a right-side joint of the user. As shown in the drawings, the multiple-joint therapy machine 10 is illustrated in configurations for addressing a left-side joint of the user, with a user-engagement assembly including a body carrier 400, 400', 1400 oriented so that as viewed from side of the support post 102 toward which the master link 120 of the multiple-joint therapy machine 10 is extended, the hinge-mount portion 154 extends to the right of the support post 102, and the fixed-mount portion 156 extends to the left of the support post 102.

To configure the multiple-joint therapy machine 10 for addressing a right-side joint of the user, any assemblies connected to the hinge-mount portion 154 and the fixed-mount portion may be disconnected and removed from the rotatable base 150, and then the rotatable base 150 is removed from the master link 120 by sliding the central tube 152 from the master link 120. The master link 120 is then rotated 180 degrees about a vertical axis (not shown). Referring to FIG. 8, the result of the rotation is that the positions of the hinge-mount portion 154 and the fixed-mount portion 156, along with the positions of the proximal portion or first portion 302 and the distal portion or second portion 304 of the linear actuator 300, are reversed. The user-engagement assemblies, each including the respective body carrier 400, 400', 1400, may then be re-connected to the hinge-mount portion 154 (now located to the upper left of FIG. 8) and to the fixed-mount portion 156 (which now would be located to the lower right of FIG. 8), with elements for engaging the body of the user placed toward the user and away from the indexing plate 130 in the direction in which the master link 120 extends. The elements of the body carrier 400, 400', 1400 may be re-oriented as necessary for engagement of an arm, leg, hand, or other body part of the user.

The multiple-joint therapy machine 2010 also may be used to impose movement or a load upon either a left-side joint or a right-side joint of the user. As shown in the drawings, the multiple-joint therapy machine 2010 is illustrated in configurations for addressing a left-side joint of the user, in which a user-engagement assembly including a body carrier 2400, 1500, 1600 may be oriented toward the same side of the device as the drive arm 2920 extends.

To configure the multiple-joint therapy machine 10 for addressing a right-side joint of the user, any assemblies connected to the drive arm 2920, or the drive arm itself 2920 may be disconnected and removed. The elements of the body carrier 400, 400', 1400 may be re-oriented as necessary for engagement of an arm, leg, hand, or other body part of the user. Alternatively, the multiple-joint therapy machine may be reconfigured merely by re-orienting or removing and reattaching the user-engagement assembly, without removing the drive hub 2900 or the carrier link 2200.

In use, the multiple-joint therapy machine 10, 2010 may provide a variety of movements to impose a variety of forces or movements upon the shoulder, elbow, knee, or other joint of the user, and may allow flexibility about the user's body position (sitting, lying prone, lying supine, etc.). For example, the multiple-joint therapy machine may be used for knee flexion and extension, elbow flexion and extension, ankle flexion and extension, shoulder flexion and extension in horizontal abduction, shoulder and elbow flexion in a seated position, shoulder extension with slight scapula rotation in a prone position, elbow flexion and extension with shoulder abduction in a supine position, shoulder flexion with abduction in a supine position, shoulder flexion (seated or supine), knee flexion in combination with hip extension, quadriceps stretching (face down), hamstring stretch. Further, a configuration as shown in FIGS. 12 and 13, or as shown in FIGS. 20 and 21, with a body carrier 1600 as shown therein, may be used to address an ankle of a user.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

With respect to the methods and processes described herein, those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure.

We claim:

1. A multiple-joint therapy machine comprising:
   a support frame;
   a planet-gear assembly mounted to the support frame, the planet-gear assembly including:
      a main shaft non-rotatably attached to the support frame and defining a main shaft axis;
      a sun gear non-rotatably attached to the main shaft;
      a planet carrier rotatably attached to the main shaft;
      a planet shaft rotatably mounted to the planet carrier and defining a planet axis; and
      a planet gear non-rotatably mounted with respect to the planet shaft to rotate together with the planet shaft,
      wherein the sun gear and the planet gear are operatively engaged so that when the planet carrier is driven to rotate with respect to the sun gear, the planet gear rotates with respect to the sun gear while revolving about the sun gear;
   a drive hub rotatably supported with respect to the planet shaft, the drive hub being configured to be releasably securable at a selectable angular orientation with respect to the planet gear;
   a carrier link operatively connected to and driven by the drive hub;
   an actuator operatively connected to drive the planet carrier at least pivotably with respect to the main shaft about the main shaft axis, the actuator having a first portion operatively connected with respect to the support frame, and a second portion operatively connected to the planet carrier;
   a body carrier mounted on the carrier link;
   a controller operatively connected to activate the actuator to urge the planet carrier, the carrier link, and the body carrier to move at least pivotably with respect to the support frame; and
   an intermediate hub non-rotatably attached with respect to the planet shaft, wherein the drive hub is configured to be releasably securable at a selectable angular orientation with respect to the intermediate hub;
   wherein the intermediate hub has at least a first hub aperture and a second hub aperture;
   wherein the drive hub comprises a planet disc, the planet disc having an axially oriented extension extending toward the intermediate hub, the planet disc having a radial arm adapted to engage and the carrier link to rotate about the planet axis; and
   wherein the drive hub is slidably mounted on the planet shaft and biased axially toward the intermediate hub to engage the extension with a selectable one of the first hub aperture and the second hub aperture, and the drive hub is configured to slide axially away from the intermediate hub so that the extension disengages the selected one of the first hub aperture or the second hub aperture, and the drive hub may be rotated with respect to the intermediate hub while the extension is disengaged, and the drive hub is biased to re-engage a second selected one of the first hub aperture or the second hub aperture to secure the drive hub to rotate with the intermediate hub.

2. The multiple-joint therapy machine of claim 1, further comprising an elastic disc disposed on the planet shaft adjacent the intermediate hub.

3. The multiple-joint therapy machine of claim 1, wherein the drive hub has a drive arm configured for engaging and driving the carrier link, and
   wherein the drive arm includes a carrier-link fitting for engaging the carrier link.

4. The multiple-joint therapy machine of claim 3, wherein the carrier-link fitting telescopically engages the carrier link.

5. The multiple-joint therapy machine of claim 1, wherein the body carrier includes base link, the base link being a movable and securable with respect to the carrier link along a length of the carrier link.

6. The multiple-joint therapy machine of claim 5, further comprising:
   a transverse link extending transversely to the base link;
   a pivoting base attached to the transverse link, the transverse link being is pivotable about a vertical axis;
   a pivoting link extending from the pivoting base;
   a lower-arm platform extending transversely from the pivoting link; and
   a hand grip extending transversely from the pivoting link.

7. The multiple-joint therapy machine of claim 6, wherein the pivoting link and the hand grip are mounted pivotably with respect to the transverse link to allow the hand grip to rotate or pivot.

* * * * *